Inventors:
Loren E. Shelffo
Henry A. Mathisen
Frank L. Schwager
By: Sol L. Goldstein
Atty.

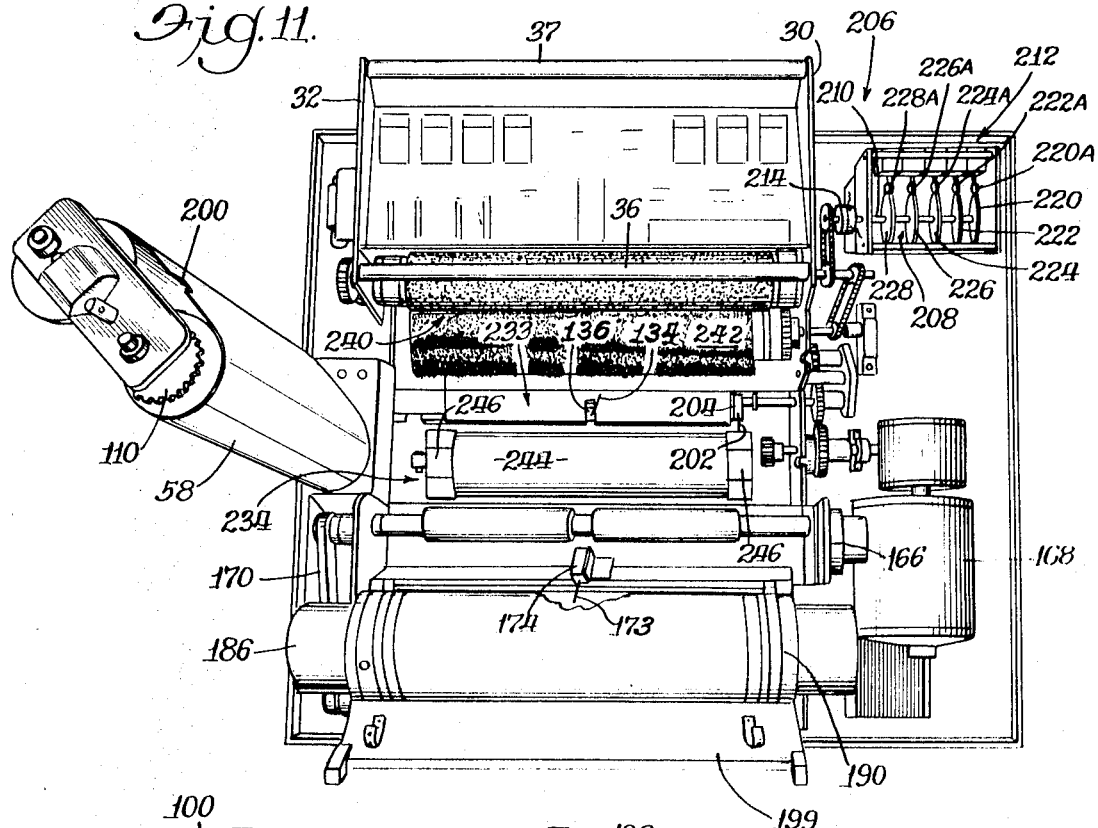

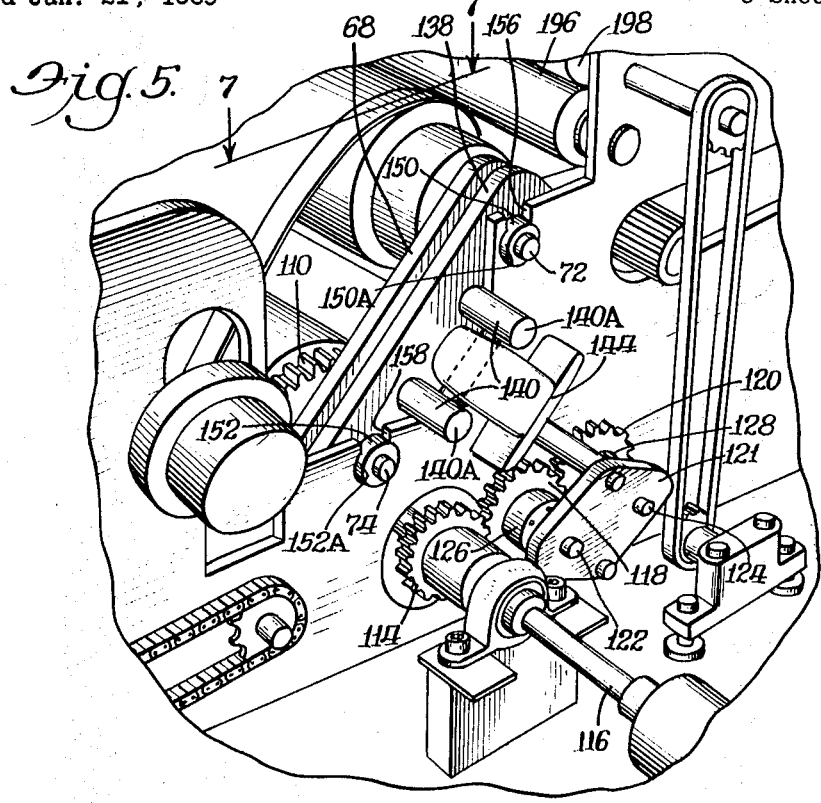
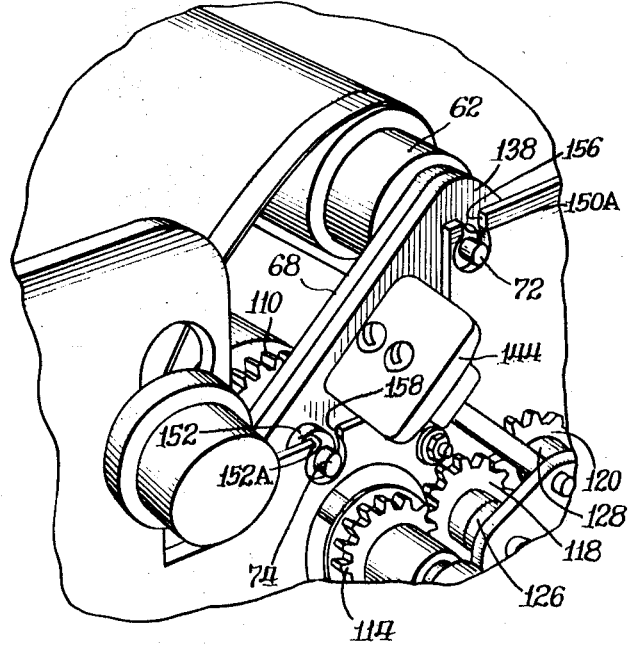
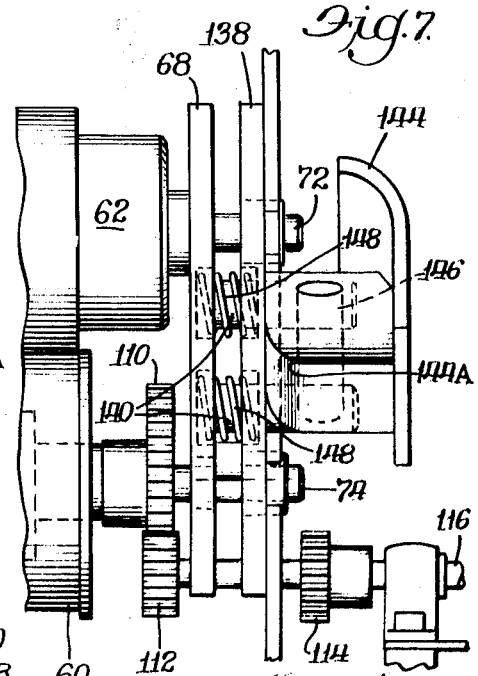

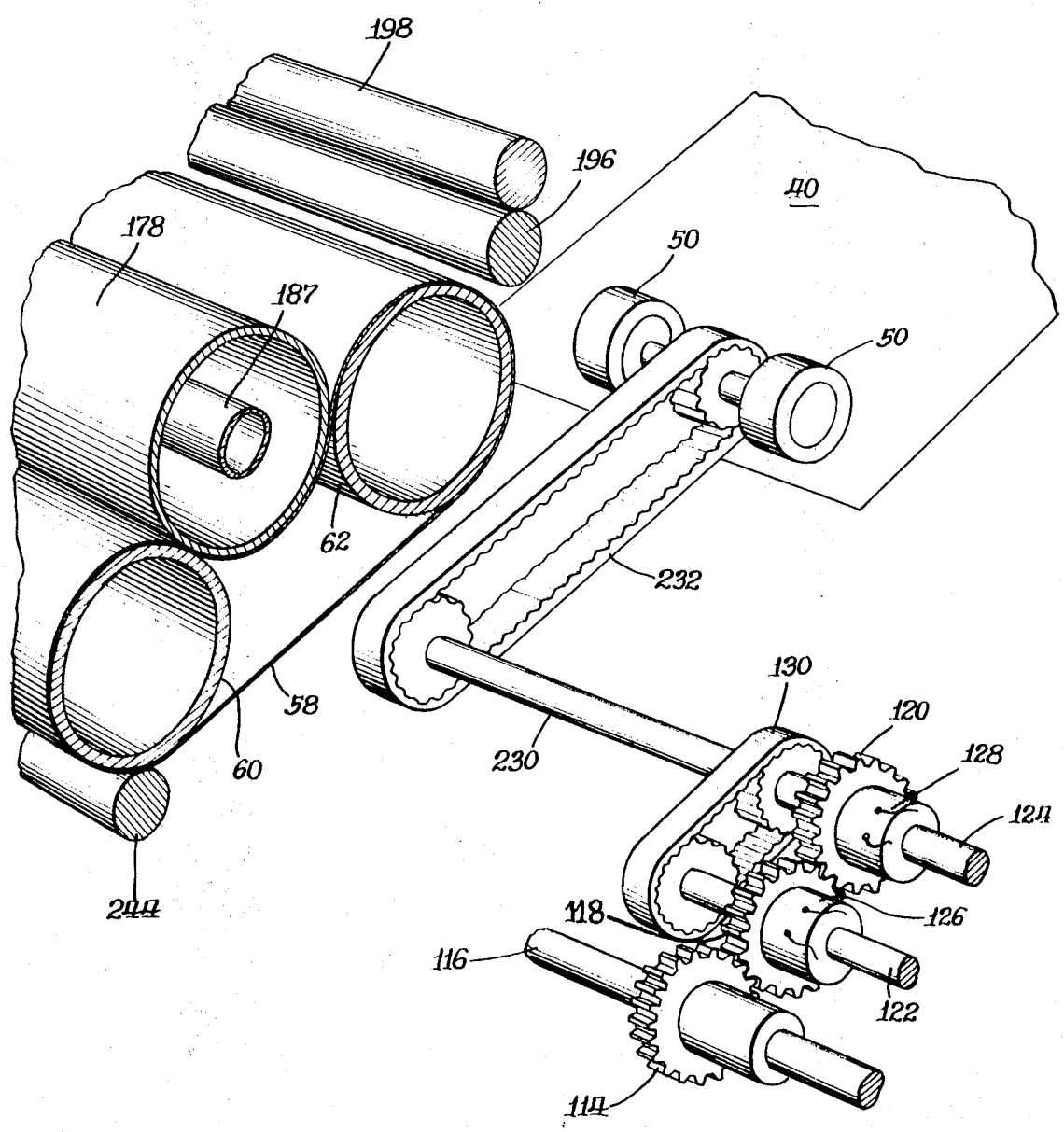

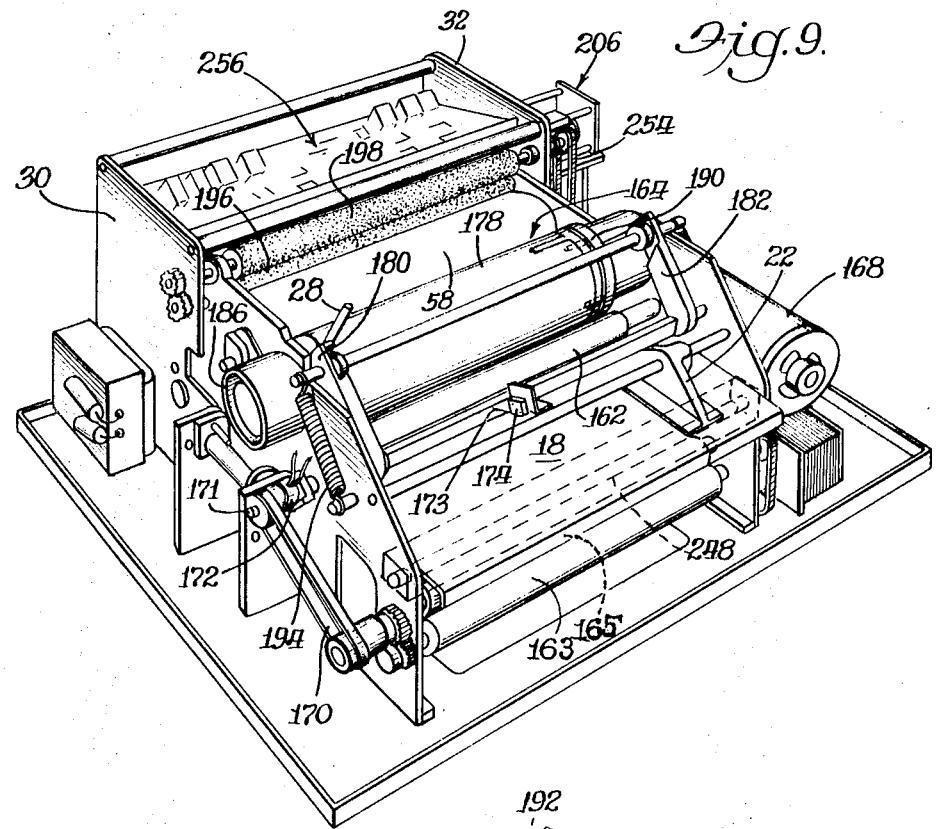

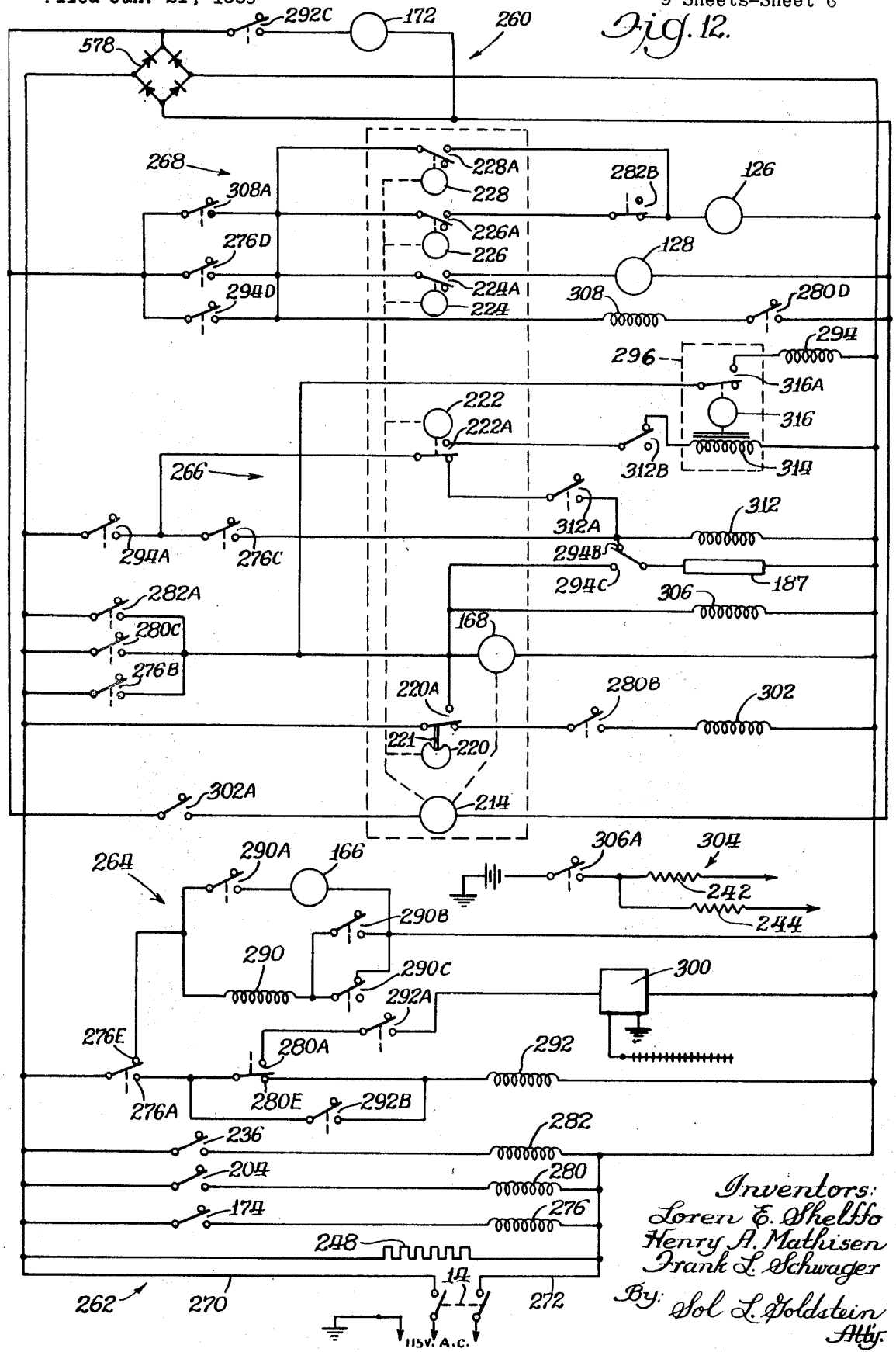

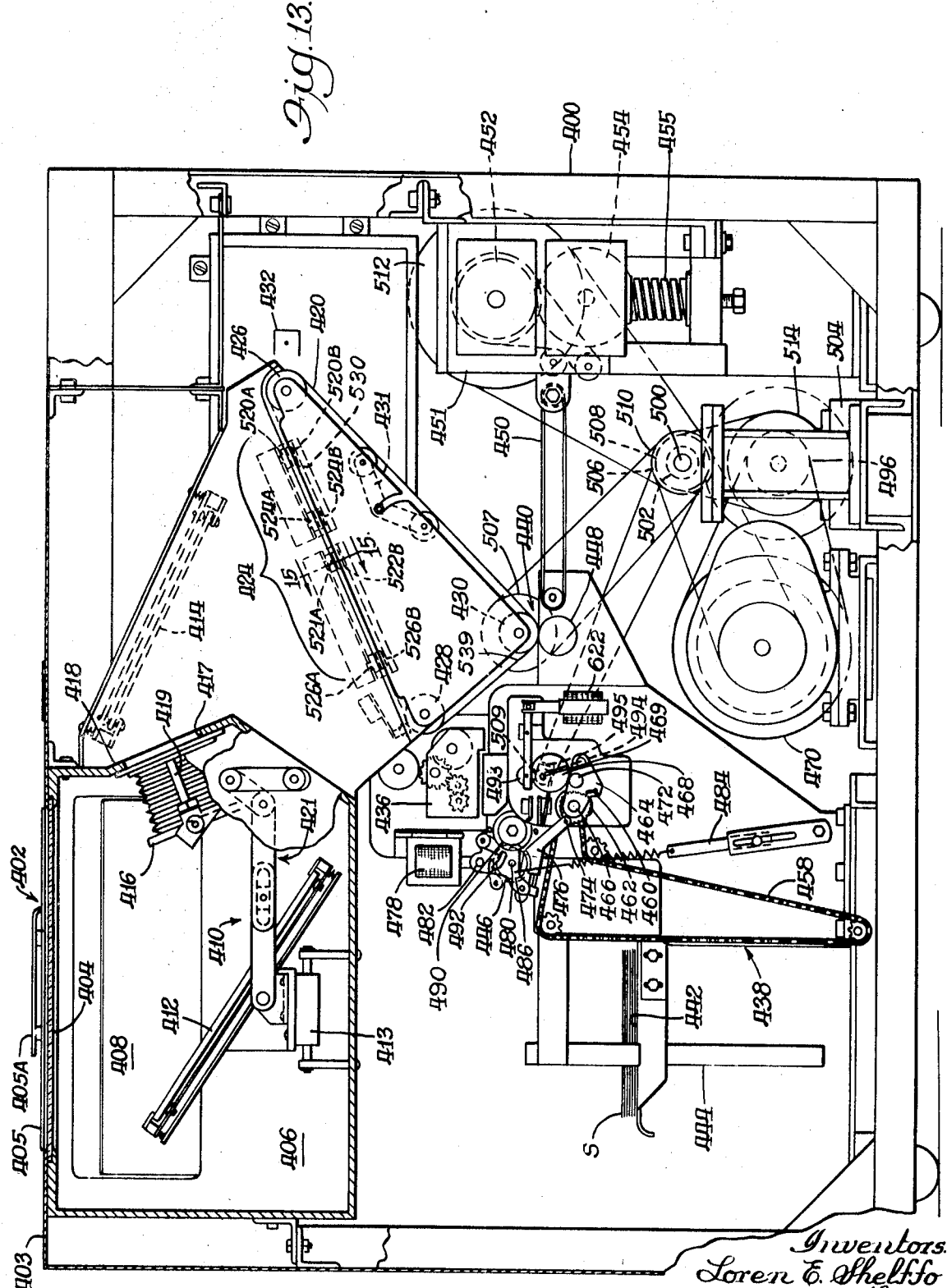

Sept. 20, 1971   L. E. SHELFFO ET AL   3,606,532
PHOTOELECTROSTATIC DUPLICATOR

Filed Jan. 21, 1969   9 Sheets-Sheet 8

Inventors:
Loren E. Shelffo
Henry A. Mathisen
Frank L. Schwager
By Sol L. Goldstein
Atty.

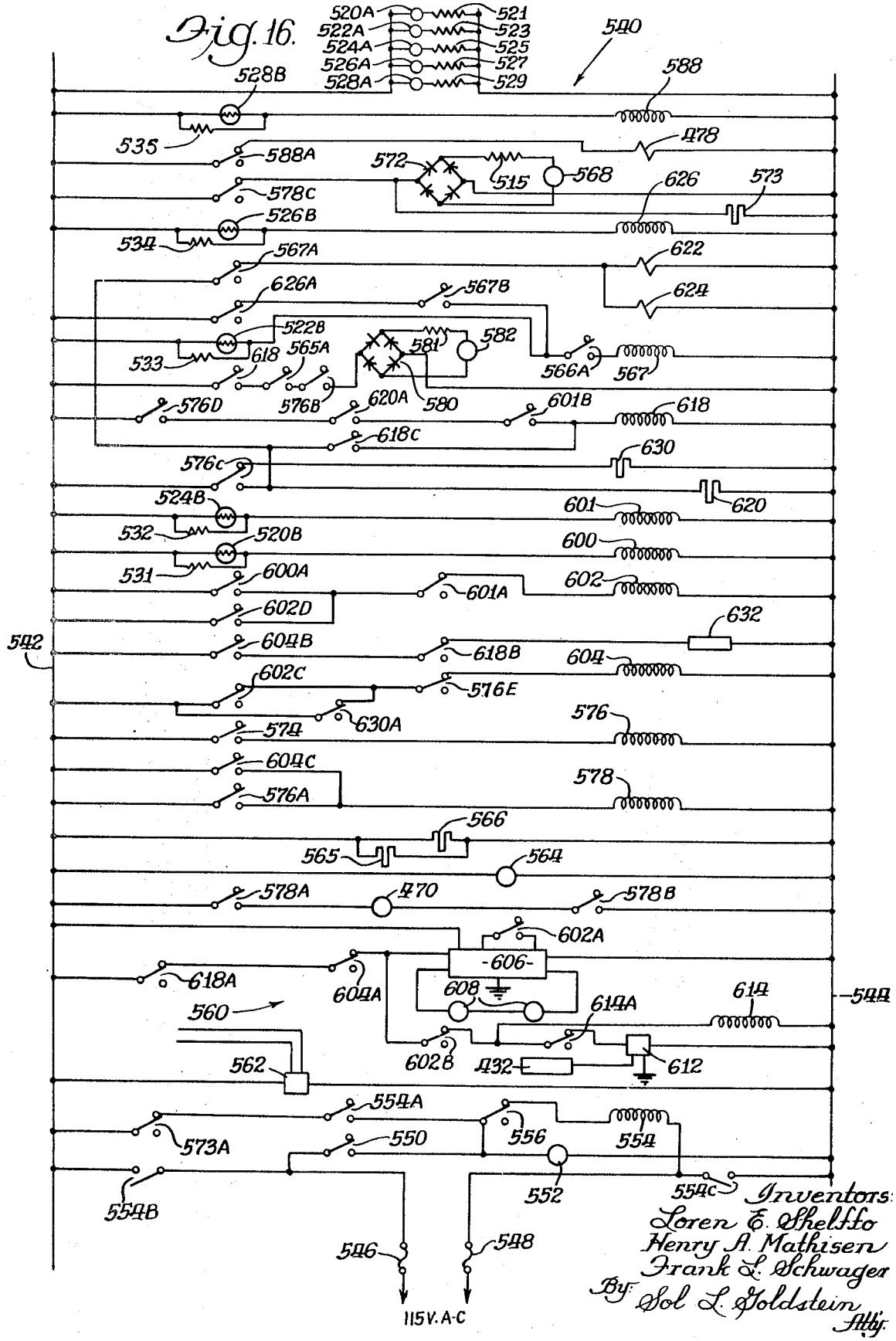

United States Patent Office 3,606,532
Patented Sept. 20, 1971

3,606,532
PHOTOELECTROSTATIC DUPLICATOR
Loren E. Shelffo, Palatine, Henry A. Mathisen, Northbrook, and Frank L. Schwager, Mount Prospect, Ill., assignors to Addressograph-Multigraph Corporation, Mount Prospect, Ill.
Filed Jan. 21, 1969, Ser. No. 762,617
Int. Cl. G03g 15/00
U.S. Cl. 355—3
42 Claims

ABSTRACT OF THE DISCLOSURE

An automatic photoelectrostatic copier duplicator capable of making reproductions on plain paper using electrostatic printing techniques. The apparatus is equipped with a photoconductive medium formed into a continuous belt which carries a transferable powder image and which image is transferred to a receiving sheet of plain paper fed from a supply to a transfer station in timed relation with the arrival thereat of the transferable powder image. The belt is provided with a marker which is recognized by sensing devices which are part of an electrical control system.

BACKGROUND OF THE INVENTION

This invention relates generally to photoelectrostatic copying equipment and more particularly, relates to apparatus for making copies using a photoconductive medium into a continuous belt on which a transferable material image is created.

The advent of organic photoconductive materials has simplified the duplicating process such as described in U.S. patent application Ser. No. 675,463, filed on Oct. 16, 1967 in the name of Evan S. Baltazzi et al. and assigned to the same assignee as the instant application. Such photoconductive systems permit the reuse of the photoconductive medium for different originals in succession but also the duplication of a number of editions of a single original by utilizing the latent image transfer technique. This technique involves the utilization of a latent image on both organic and inorganic types of photoconductors by successively transferring the powdered image and redusting the latent image under controlled conditions. A detailed description of duplicating using latent image transfer is fully described in U.S. application Ser. No. 632,819, now abandoned filed Apr. 21, 1967, in the name of Loren E. Shelffo, and assigned to the same assignee as the instant application.

Apparatus designed to utilize a flexible belt-type photoconductor should desirably be compact in construction so that it occupies a minimum amount of floor space.

One of the problems of heretofore known equipment was the complexity of the construction which gave rise to high incidence of servicing required by the user. It is desirable that duplicating equipment designed for photoelectrostatic systems have a low incidence of service calls and be relatively maintenance free.

The equipment should have a high volume of output whether the requirement is for a single copy of many different originals or many copies from a single original and, the equipment should be capable of automatically going from one mode of operation to the other without extensive operator adjustment.

The photoconductive medium should be inexpensive, highly reliable and replacement of the photoconductive medium should be uncomplicated so that it can be carried out by the operator.

It is a general object of this invention to provide a new and improved photoelectrostatic automatic copying machine for producing high quality reproductions on plain paper.

It is a specific object of this invention to provide an improved photoelectrostatic copying machine capable of making multiple reproductions using a latent electrostatic image of one original onto plain paper automatically and at a high rate of output.

It is another object of this invention to provide an improved photoelectrostatic copying machine capable of making one copy each of several different originals successively from the same photoconductive medium automatically.

It is another object to provide an improved photoelectrostatic copying machine employing a continuous photoconductive belt having novel means for controlling the sequence of operations associated with electrostatic imaging techniques permitting several imaging operations to occur simultaneously as the belt moves through its cycle.

Still another object of the invention is to provide an improved photoelectrostatic copying machine having a novel control means for selectively effecting the exposure of an original at the exposure station in timed relation with the movement of the belt and to feed a copy sheet at the appropriate time to receive the transferable image thereon.

The photoconductive medium itself is comprised of a base portion comprising a polyester film on which is deposited the photoconductive layer forming the outside surface of the belt.

One embodiment of the apparatus of this invention comprises in combination, a feed station for receiving an original to be reproduced, an exposure station, photoconductive medium in the form of a continuous belt disposed about a pair of rollers so that the photoconductive medium moves in a predetermined path, a developing station for applying developer powder to a latent electrostatic image produced on the photoconductive layer which is transferable, a supply of plain paper for receiving the transferable image, a transfer station, and a charging station for applying a sensitizing charge to said photoconductive layer in advance of its movement to the said exposure station. In this particular embodiment, the reproduction technique is that of contact printing whereby the original is required to contain graphic subject matter on only one side. The reproduction of two-sided originals, that is an original which may have a graphic representation on both sides, will be discussed in relation to another embodiment of this invention.

The photoconductive medium on which is to be created a material image is placed on an assembly around a pair of axially parallel rollers for moving the photoconductive medium in a predetermined path past the several stations. The belt assembly is disposed generally in the central part of the apparatus and arranged so that the photoconductive surface moves past a number of processing stations which are arranged in a planetary manner about its path of movement. The exposure station is situated at that portion of the belt that spans the two rollers forming an exposure area therebetween.

Superimposed on the belt is a transparent rotatable cylinder extending transverse the width of the belt, tensioning the belt, so that it follows a portion of the surface of the cylinder causing the cylinder to rotate with the movement of the belt. Inside the transparent cylinder is mounted an elongated radiation source for directing electromagnetic radiation onto the photoconductive layer. As the original emerges from the nipping rollers of the feed station it is received between spaced apart guide members which guide the original into the nip formed between the transparent cylinder and the photoconductive layer. It will readily be appreciated that the type of exposure arrangement is such that the photoconductive belt forms part of the assembly which supports and conveys a graphic original and at at the same time receives the pattern of light and shadow resulting from directing electromagnetic radiation against the original.

In advance of the exposure station, there is provided a charging station at which there is applied to the photoconductive layer a sensitizing electrostatic charge in the range of 400 to 1000 volts. A corona electrode is placed just beneath the guide members which comprises the charging station. The electrode comprises a conductive shield maintained at a reference potential, usually at ground, having suspended therein one or more fine wires connected to high voltage DC supply source. In the circumstance that the photoconductive layer consists of an organic photoconductive material it can be charged either negatively or positively depending on the type of duplicating system involved. Generally, a positive copy from a positive original will require a negative sensitizing charge which is developed with a positive oriented developer powder. On the other hand, a positive sensitizing charge may be employed to equal advantage when it is desired to use a film negative as the original which is then developed with a reversal oriented powder to produce a positive image.

As the original is received between the transparent cylinder and the charged photoconductive belt, there is formed an assemblage comprising the cylinder wall, the original, and the belt. As succeeding transverse segments of the assemblage pass the illuminating source, each element of the assemblage is in intimate contact with one another. As the radiant energy source is activated, radiation is directed onto the original, either against the face or the back of the original, and thence to the charged photoconductive layer producing a pattern of light and shadow thereon. This will result in the dissipation of charges in the light struck areas so as to result in a latent image on said surface. As each transfer segment of the original is exposed, it advances from between the cylinder and the belt to be received in a receiving tray in the rear of the apparatus.

The belt assembly is constructed in a manner that permits easy mounting and removal of the continuous belt. The pair of rolls are disposed on a pivotably mounted yoke assembly that permits tilting the assembly from a locked horizontal operating position to a raised vertical position permitting mounting and removal of the belt over the free end of the assembly.

The rollers are rotatably retained between parallel side plates with their shafts being received in bearing members mounted in said plates. One of the side plates is hingedly mounted to the main frame of the apparatus while the other side plate is equipped with a locking structure for securing the assembly to its operating position on the main frame.

The locking structure is associated with the free end of the assembly and provides for a pair of plates, one of which is secured to the roller assembly and a second movable plate which carries the bearing members and which rotatably receive the shafts for each of the rollers. The second plate is spring biased away from said first plate urging the bearings into suitable cutout portions in the main frame. Movement of the bearing plate is controlled by a cam lever which compresses the springs causing the retraction of the bearings from the openings in the main frame and in contact with the first fixed plate so that the assembly can be pivoted to its vertical position along the hinged mounting. In the vertical position the used belt may be removed from the pair of rolls and a new belt easily slipped on and the assembly returned to its operating position by releasing the cam lever which urges the bearings into the U-shaped cutouts and thereby locking the assembly into position.

As part of the assembly one of the shafts has axially mounted thereon inside the fixed plate a drive gear which in the operating position meshes with the gear train of the main drive thereby connecting the rollers to the drive system.

Adjacent the path of the belt and located just beyond the exposure station is the developing station for applying the electroscopic powder to the latent electrostatic image which is produced at the exposure station. In the instant invention it is found convenient to employ a magnetic brush type applicator. However, it should be understood that other means of developing a material image may be employed such as cascade development, powder cloud development or liquid developing systems. A detailed description of the magnetic brush construction as employed herein may be had by referring to U.S. Patent 3,246,629 granted Apr. 19, 1966 to Loren E. Shelffo and assigned to the same assignee as the instant invention.

The brush type applicator includes a rotatable tube having fixed magnetic means disposed within and adjacent the inside surface thereof. As the tube rotates in a developer mixture comprising electroscopic powder and magnetically attractable iron carrier particles, the developer mix is attracted to the surface of the tube by virtue of the magnetic field produced by the fixed magnets within the tube. As the tube rotates the developer mix is held on the surface as it moves into the field of concentrated magnetic flux, and forms up into a brushlike configuration to facilitate the application of the developer mix to the surface of the belt.

Through the use of the magnetic brush, greater control over the developing step may be obtained by applying a potential to the brush which is particularly important when using organic photoconductive materials as the photoconductive medium. The metal housing of the brush is connected to a DC potential which may vary from 50 volts to 1200 volts so that the potential at which the developer mix is maintained when it contacts the photoconductive surface of the belt is at a potential less than the voltage in the latent image area. The difference in potential between the brush and the latent image may be about 100 volts.

As the tube continues to rotate the developer mix moves outside the concentrated field of magnetic flux and tends to fall off the cylinder and into the trough where it is remixed with the main body of the developer and the process is successively repeated.

The belt now emerges from the developing station bearing a transferable powder image which may be transferred to a sheet of plain paper.

A magazine in which a supply of plain paper is maintained during the operation of the apparatus consists of a horizontal platform or table provided with brackets or side plates to keep the edges of a stack of sheets in vertical alignment and which is, in effect, an open-top tray equipped with a mechanism to advance a single sheet from the top of the stack to a transfer station. The tray is slidably mounted on the base portion of the apparatus and supported in position by side brackets which are received on a horizontal cross bar suspended above the tray and which also serves as a tie rod for the main frame structure.

A pair of rotatable friction tires rest on the topmost sheet of the stack which serve to advance the sheet to the transfer station in response to an apropriate signal from the electrical control system. The sheet is advanced from the stack in timed relation with the image-bearing portion of the belt so that both will arrive at the transfer station permitting the transfer of the full image carried on the belt in proper registration with the area of the copy sheet and properly located thereon.

The transfer station comprises a transfer roller consisting of a rubber outer layer formed around a hard conductive core which is rotatably mounted between the main frames of the machine so that the axis of rotation of the transfer roller is parallel to the axis of rotation of the second drive roller for the belt drive assembly.

It will be appreciated that the transfer roller is arranged so that it rides against the second drive roller of the belt drive assembly so that the belt passes between the transfer roller and the belt drive roller. In order to effect the proper transfer of the material image uniformly and completely to the receiving sheet, it is necessary to strictly control the pressure setting between the transfer member and the photoconductive image bearing layer. A more detailed description of the importance of pressure in latent image duplication may be found in the aforementioned U.S. Serial No. 632,819, filed in the name of Loren E. Shelffo. In order to assist the transfer of the material image there is applied a DC voltage to the conductive core which is poled the same sign as the charge in the image bearing portions of the latent image. The potential applied to the transfer station may range anywhere from 300 to 3000 volts depending on the nature of the photoconductive layer.

As the sheet of paper is advanced to the transfer station sandwiched between the transfer roller and the image-bearing surface of the belt, a positive reading image is transferred to the receiving sheet. It will be remembered that the image produced on the photoconductive layer at the exposure station is reverse reading.

As the receiving sheet emerges from the transfer station, it is received onto a conveyor belt and is advanced to a fixing station where the transferred powder image is permanently fixed by heat to the paper support and thence is ejected into a receiving tray.

The fixing of the powder material image may be accomplished using other techniques besides heat fusion of the thermoplastic powder image. It is well known to use a vapor fusing technique to soften the synthetic resin particles. Another technique involves the use of pressure systems by which the thermoplastic material on the receiving sheet is caused to adhere by pasing it through rollers in pressure contact with one another.

An important feature of the machine is the control system wherein the aforedescribed processing steps are synchronized with the movement of the belt so as to maintain the proper sequencing control to create the image on the photoconductive medium and then to cycle the belt containing the latent electrostatic image, redusting the latent image and transferring the powder image to plain paper automatically. The photoconductive material formed into a continuous belt, not only functions as the photoconductive surface on which the latent and powder images are produced, but also its movement in a predetermined path provides a reference against which the sequence of the various processing steps may be measured in order to provide an integrated program. To accomplish this the belt is provided with a marker or multiple markers which are designed to cooperate with sensing devices for sensing the location of the marker and thereby monitor the position of certain portions of the belt as it moves in its predetermined path. The sensing devices respond to the presence or absence of a marker to initiate or terminate a certain function. A control circuit is coupled with the sensing devices for controlling certain of the instrumentalities necessary to program the entire duplicating process.

It will be appreciated that the photoconductive medium formed into a continuous belt with said marking or markings thereon takes on the character of a control tape such as may be employed to program certain equipment automatically. The apparatus of the instant invention is unique and gives surprising results because the belt is not only the photoconductive medium on which the various processing steps are carried out, but it also serves to program the operations.

In another embodiment of this invention a continuous belt-type photoconductive medium is employed which is adapted for movement in a predetermined path and is controlled in its movements by a series of drive rollers whose axis of rotation are in parallel alignment. In this second embodiment, the photoconductive belt is adapted to carry at least two images simultaneously and therefore the sequence of operations become somewhat more complicated. In order to control the sequence of operation multiple markers are employed along the lateral edge of the belt which operate in conjunction with sensing devices located along the belt path and which respond to the presence or absence of the markers. Responsive to the sensing devices is a control circuit for automatically processing an original that is manually fed into the machine until the predetermined number of reproductions of that original have been completed.

In the second embodiment, the apparatus is adapted to handle two-sided originals as well as subject matter contained in bound volumes, accomplished through the use of an optical system for projecting a pattern of light and shadow onto the photoconductive belt at the exposure station.

The apparatus of the second embodiment is similar in its general arrangement to the first embodiment described hereinabove with the exception that the belt is of a larger circumference and is guided over a path formed by a series of at least three rollers whose axes of rotation are in parallel alignment so that, as the belt courses over the array of rollers, there is provided a flat stretch of the belt under tension which serves as the exposure plane for the projected image.

The apparatus is contained in a rectangular shaped framework or enclosure having a flat top wall surface equipped with the window opening containing a transparent platen on which is received the original subject to be reproduced. The original subject matter is placed with the graphic material face down on the transparent platen. Underneath the platen is positioned the source of radiation for illuminating the original subject. While conventional radiation sources may be used, such as tungsten filament lamps sold by the General Electric Company and identified as a T-3 lamp, other sources of radiation may be employed. The preferred source of radiation in the instant embodiment is a xenon radiation source capable of emitting a high intensity flash of radiation over a short period of time so that the pattern of light and shadow that is produced upon illumination of the entire window area is transferred by a suitable optical system to that portion of the belt surface that is moving through the exposure area. It will be appreciated that such an exposure can be accomplished while the photoconductive belt is in motion.

In advance of the exposure station there is a charging assembly which applies a sensitizing charge to the photoconductive layer on the belt. Conventional corona discharge electrodes are employed to deposit a blanket electrostatic charge of the desired polarity to the surface of the photoconductive medium. As the belt courses through the exposure station, it enters the developing station where the latent image is developed by the application of an electroscopic powder. The developing station is similar in construction to the developer described in connection with the first embodiment.

The material image formed on the belt is a transferable image which is transferred to a receiving sheet under strictly controlled conditions of pressure at the transfer station. The technique of effecting the transfer is again similar to the construction previously described.

A stack supply of plain paper is located at the back end of the housing and arranged to feed the paper to the transfer station in timed relation with the arrival of the transferable image thereat so that all of the developed image is transferred to the receiving sheet and in proper registration thereon.

The arrangement of the apparatus provides for the location of the various instrumentalities in a planetary fashion about the path taken by the belt. The belt is equipped with markers disposed along its lateral edge which operate in conjunction with sensing devices to monitor the belt movements, and hence, various portions of its working surface are located relative to the various instrumentalities which act upon it. The markers are located at equal distances along the belt circumference, two markers being provided, one for each copy area of the belt.

At the start of the duplicating operation from a shutdown condition of the apparatus the instrumentalities will be in their inoperative condition including the belt which is in an unsensitized or uncharged condition.

A portion of the belt surface resides in the exposure plane, but as has been stated, it is uncharged. The second imageable portion resides along the approach to the charging station. A series of sensing devices, such as switches or photocell units are positioned along the path that traverses the exposure station for sensing the movement of the respective markers which, in turn, energize the control circuit for controlling the sequence of operations. The switches may be mechanically operated through a sensing arm which rides along the edge of the belt and is actuated when it engages the marker. Another technique may be the use of a photosensitive cell in cooperation with a light source so that the interruption of a beam of radiant energy actuates the sensor. Still another technique may be the use of sensors which detect electrical differences between the marker and the unmarked portion of the belt so as to produce the proper signal.

One of the sensing devices locates the home position for the belt. The home position represents a start position or reference point from which the functions of the copying sequence are timed. Other sensors control respectively, the illumination source, the power supply circuit for the charging electrode and the transfer station and the feeding seriatum of single sheets of paper from the paper supply stack each time a copy is required. The sequence calls for an imaging cycle during which time the belt receives its full complement of latent images on its surface and thereafter goes into a duplicating cycle to automatically produce the total number of reproductions that have been programmed into the apparatus by the operator.

DESCRIPTION OF THE DRAWINGS

The apparatus in accordance with this invention for the photoelectrostatic reproduction of images has been generally described and some of its advantageous features pointed out above. The embodiments of this invention will now be described wtih reference to the accompanying drawings, in which like reference characters have been used to refer to like parts wherever they may occur.

In the drawings:

FIG. 3 is an enlarged detail taken in section along lines 3—3 of FIG. 10 showing a latching mechanism for the belt mounting unit;

FIG. 4 is an end view of the latching mechanism of FIG. 3 taken along lines 4—4;

FIG. 5 is a fragmentary perspective view of the retractable bearing mount employed to engage the belt drive rollers with the drive mechanism shown engaging the side frame of the apparatus;

FIG. 6 is a fragmentary perspective view similar to FIG. 5 shownig the bearings disengaged from the side frame;

FIG. 7 is a top view taken along lines 7—7 of FIG. 5;

FIG. 8 is a fragmentary perspective similar to FIG. 5 with the various rollers in section showing the sheet feed system;

FIG. 9 is a perspective view of the apparatus with the outside shell removed looking towards the front end with the elements in their operating position;

FIG. 10 is a perspective view looking toward one side of the apparatus showing the exposure assembly in its open position;

FIG. 11 is a plan view with the outside shell removed and the belt mounting mechanism in a raised position showing the various drive rollers and the timing cam control unit;

FIG. 12 is a schematic wiring diagram for the apparatus of this invention;

FIG. 13 is a side elevation of the second embodiment of the apparatus of this invention with the side cover removed;

FIG. 16 is an electrical wiring diagram of the entire control circuit for the second embodiment of the apparatus of this invention.

DESCRIPTION OF THE PREFERRED EMBODIMENTS

Figure 1:
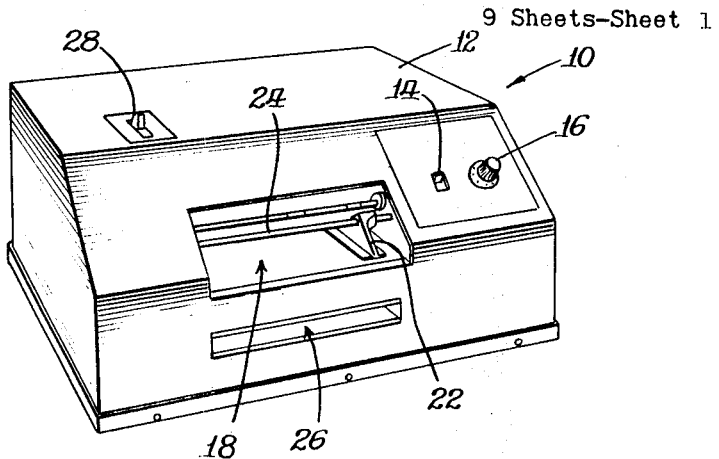
FIG. 1 is a perspective view representing one embodiment of the apparatus of this invention which features a contact type exposure.

Referring now more specifically to FIG. 1, there is illustrated a copying machine which is indicated generally as 10 and which represents one embodiment of the present invention. The machine 10 includes a housing 12. The front panel of the machine 10 carries a main switch 14 for turning on the power. Included on the front panel of the machine is a dial 16 which is set by the operator for programming the number of copies to be reproduced. At the front of the housing there is provided an infeed station 18 into which is fed the original subject matter to be reproduced. The machine is adapted to handle varying widths of originals and an adjustable guide element 22 which is slidably mounted on a tie bar 24 may be adjusted to accommodate various widths of original so that they will be centered on the photoconductive belt. Immediately below the infeed station 18 is an exitway slot 26 in the front face of the housing through which the finished copy exits from the apparatus.

At the top of the housing a manually operated lever 28 is provided for regulating the amount of illumination to be directed onto and through the original to create a pattern of light and shadow on the photoconductive layer.

Figure 2:
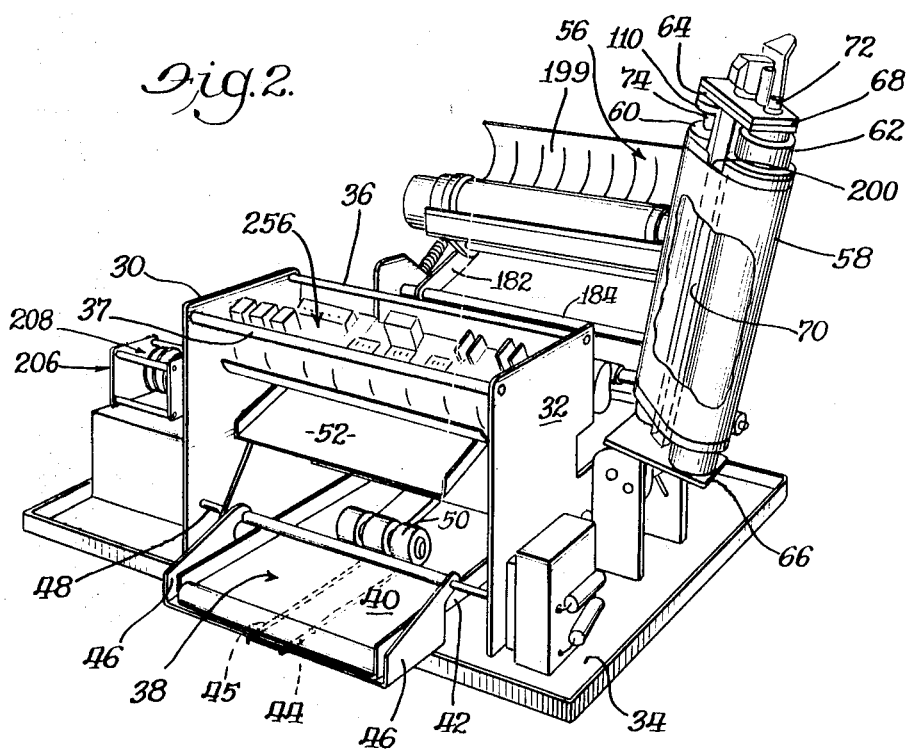
FIG. 2 is a perspective view looking toward the back of the apparatus with the outside shell removed showing the belt mounting mechanism and the exposure assembly in their respectively raised positions.

In FIG. 2 there is shown the apparatus with the outer shell removed exposing to view the mounting assembly for the photoconductive medium in a raised position, the paper feed supply, the radiation source, and the exitway for the original. The various instrumentalities and assemblies are supported between the main right and left side plates 30 and 32, respectively. The side plates 30 and 32 are secured to a base plate 34 which forms the floor of the apparatus.

Between the side plates there is a magazine assembly 38 in which a supply of plain paper 40 is supported on horizontal platform or table 42. The table is slidably received on a center track 44 that runs longitudinally along the base plate 34, which fittingly engages slot 45 formed in the bottom of the tray. The tray 42 in turn is supported on a bracket 46 that hooks on a tie bar 48 for structurally supporting the side plates 30 and 32. Resting on top of the stack supply of paper 40 are a set of friction wheels 50 which are intermittently operated to advance the uppermost sheet in the stack to the transfer station where all of the powder image created on the belt is transferred to the paper. Thereafter it is permanently fixed on the paper at the fixing station.

Immediately above the magazine is a guide chute 52 that guides the original that entered at station 18 out the back of the apparatus after it passes through the exposure station.

The belt mounting assembly identified generally as 56 is shown in a raised position from its normal position.

The assembly 56 is located centrally in the apparatus lying transverse to the direction of the original and is locked in position betwen the side plates 30 and 32. The continuous belt 58 is disposed around a pair of rollers 60 and 62 which are rotatably mounted in an I-shaped yoke 64. The I-shapde yoke 64 is made up of a pair of opposing parallel end plates 66 and 68 which are held in spaced apart relation by a structural bar member 70 that extends normal to the plate surfaces and between the rollers. The rollers 60 and 62 are rotatably mounted on a pair of parallel aligned shaft members 72 and 74, said shafts being received in bearing members which, in turn, are mounted in the plates 66 and 68 so that the rolls are free to rotate. The largest cross-sectional dimension of the assembly 56 is smaller than the corresponding dimension of the belt so that it can easily slip on and off the pair of rollers.

The pivotal mounting of the belt assembly is shown in FIGS. 3 and 4 in which the plate 66 is secured to a hinge element 76 which is adapted to rotate inside a pair of fixed upright plate supports 78 and 80 which extend normal to the side plate 32. The hinged member 76 turns on the rod portions 81 and 82 which extend from the pair of end plates 84 and 83, respectively which in turn are held spaced apart by the member 85. Rod portions 81 and 82 are rotatably received in the upright plates 78 and 80. To latch the belt assembly in the vertical positions, a latching mechanism is provided which comprises a tubular member 88 fixed between the end plates 83 and 84 and having slidably mounted therein a pair of pins 90 which are urged laterally outward from the ends of the tube by a coiled spring 95 disposed inside the tube. The pins 90 pass through openings 94 and 96 in the end plates 83 and 84, respectively, to become lodged in the openings 102 and 104 in the left and right side plates 78 and 80, respectively. Each of the pins 90 has extending normal therefrom through elongated openings 98 in the tube 88 pinch rods 100 which permit retraction of the pins to a position so that their respective free end clears the outermost surface of the end plates 83 and 84. Openings 106 and 108 are provided in the plates 78 and 80, respectively, so that when the belt assembly is pivoted to its raised position, the pins will normally be urged outward from the tube 88 along its axis into the openings 106 and 108 locking the assembly in the vertical position. In order to unlatch the assembly to change its position, the pinch rods 100 are moved toward one another retracting the pins 90 until they are completely clear of the openings 102 and 104 or 106 and 108 placing the spring 95 under compression and thereby permitting the belt assembly to be pivoted to its horizontal position which is determined when the pins 90 are in alignment with the openings 102, 104 at which time the spring 95 urges the rods outwardly into the openings, thereby latching the assembly in position.

Referring now to FIGS. 5, 6, and 7 there are shown the details of the latching mechanism that aligns the rollers 60 and 62 so that they may be properly engaged with the drive mechanism in a manner that permits the belt to coact with the other portions of the drive system to be properly moved along its predetermined path. The drive rollers and the belt assembly must be in proper alignment with the other drive systems in the apparatus controlling the original path and the copy sheet path so that these elements properly engage the belt as all of the elements move in their respective paths.

A drive gear 110 (FIG. 7) is mounted on the portion of the shaft 74 of roller 60 that is just inside the plate 68. The gear 110 is part of a gear train consisting of gears 112 and 114 (FIGS. 6 and 7) which are coaxially mounted on the main drive shaft 116 coupled to the main drive motor (not shown). Part of the gear train includes gears 118 and 120 (FIG. 5) axially mounted on stub shafts 122 and 124, respectively, being rotatably mounted in a support bracket 121. The gears 118 and 120 are continuously driven through engagement with gear 114 which in turn is directly coupled through shaft 116 to the main drive motor. Gears 118 and 120 are coupled to the friction wheels 50 (FIG. 8) through clutch units 126 and 128 and gear belt drive 130 which control the directional rotation of the feeder wheels.

It will be appreciated that the belt assembly 56 when it is lowered to its operating position must return to a predetermined position that is in registration with the other drive elements of the apparatus so as to be able to receive, for example, the copy sheet which is now advanced to a ready position. Associated with the plate 68 is a second movable plate 138 in parallel alignment with the plate 68 having openings therein to receive the extensions of shafts 72 and 74. A pair of pins 140 having one end affixed to the plate 68 extend through the plate 138. The free ends 140A of the pins 140 which extend through the other face of the plate 138 carry a cam lever 144 which is received between the pins extending from the face of plate 138 being pivotably received on a cross pin 146 (FIG. 7) secured between the pins 140.

Surrounding the portions of the pins 140 contained between the plates 68 and 138 are a pair of coiled springs 148 (FIG. 7) and anchored to the opposing faces of the respective plates, and which urge the plate 138 outward from the plate 68 in a sliding manner over the shafts 72 and 74 and the pins 140. The plate 138 is equipped with bearing members 150 and 152 which are fittingly received in the openings 156 and 158 in the side plate 30 and on the shafts 72 and 74. The bearing members 150 and 152 are wider than the thickness of the side plate 30 and hence the portions thereof 150A and 152A extend beyond the surface of the side plate 30.

By rotating the cam 144, the cam face 144A (FIG. 7) engages the plate 138 which is urged against the plate 68 placing the coiled springs 148 under compression thereby retracting the exposed bearing portions 150A and 152A until they clear openings 156 and 158 (FIG. 5). With the bearing portions in their retracted position the belt assembly may now be moved from its horizontal position to its raised position. In the circumstance that it is to be returned to its operating position, the cam lever 144 is rotated so as to move the cam face 144A out of contact with the plate 138. By releasing the cam level 144 the springs 148 under compression urge the plate 138 and the bearings 150 and 152 outward from the plate 68 sliding along the shafts 72 and 74 and the pins 140 into engagement with the cutout portions 156, 158 (FIG. 5) placing the entire belt assembly in its proper alignment with the rest of the apparatus.

Energization of clutch 126 drives the gear belt 130 in a counter-clockwise direction by coupling the gear 118 to the drive belt imparting a counter-clockwise rotation to the friction wheels which causes the top sheet 40 to move first in a rearward direction. Through a timing cam control, clutch 126 de-energizes and clutch 128 is energized which now imparts a clockwise direction to the gear belt drive through gear 120 reversing the rotation of the friction wheels which now moves the uppermost sheet of paper in the direction of the transfer station until it engages the sensing arm 134 of switch 136 (FIG. 11) which de-energizes the clutch 128 bringing the copy sheet to a ready position before the transfer station.

Referring to FIGS. 9, 10 and 11 there is shown the drive rollers 160 and 162 (FIG. 10) at the infeed station 18 that control the movement of the original into the exposure station 164 (FIG. 9). The upper roller 162 is an idler roll that rests on top of roller 160 which can be driven from two separate sources, namely, motor 166 (FIG. 11) and also by the main drive motor 168 through the belt drive 170 on the left side of the apparatus (FIG. 10) which is transmitted through drive shaft 171. The roller 163 is coupled to the shaft 171 through the belt drive 170. The roller set 163–165 serves to drive the copy sheet through the exitway 26. An electric clutch unit 172 couples the roller 160 with the drive for roller 163. The motor 166 is energized when the main drive switch 14 is actuated driving the rollers 160 and 162.

As the original is guided by the element 22 into the apparatus, the lead edge thereof engages the actuator 173 of switch 174, closing switch 174 which de-energizes the motor 166 and actuates the clutch 172 so that the original feed rollers are again rendered operative after a brief interruption to allow for the belt monitoring system to take over the movement of the original in synchronization with the location of the belt relative to its home position. The use of the separate drive for the infeed of the original permits another element of control during the duplicating mode, at which time the infeed is disabled so that the equipment is not able to receive an original during the duplicating mode.

The exposure station 164 includes a transparent cylinder 178 best illustrated in FIGS. 9 and 10. The entire exposure assembly is mounted on a pair of swingably movable arms 180 and 182 which pivot about the rod 184 which in turn is rotatably mounted between the side frames 30 and 32. The cylinder 178 surrounds an aluminum tube 186 which is provided with a longitudinally extending aperture 188 equipped with an adjustable shield 189 controlled by the lever 28. The cylinder 178 is concentrically supported in position around the tube 186 by the end rings 190 each being equipped with a series of guide pins 192 that extend normal to the rings and inboard thereof in the direction of the cylinder so as to engage the inside surface of the cylinder 178 forming a loose fitting bearing support. The rings 190 axially fit onto the tube 186 and are separated by a distance slightly longer than the length of the cylinder 178 with the pins 192 being received within. The pins 192 are preferably made of a material such as nylon or Teflon so as to reduce the frictional forces.

Inside the aluminum tube 186, preferably along the center line thereof, is a conventional tubular lamp 187 (FIG. 8) which is capable of emitting the electromagnetic radiation necessary to expose the charged photoconductive medium.

The exposure assembly may be swung into a raised position as shown in FIG. 10 so as to permit easy access to the inside of the machine. When lowered into its operating position, as shonw in FIG. 9, the transparent cylinder is received in the space between the rollers 60 and 62 so as to place the loosely fitting belt under tension causing the belt to course over the outside surface of the rollers 60 and 62 and underneath the transparent cylinder 178 forming therebetween the exposure zone (FIG. 8) by the various surfaces which are in intimate contact with one another. The condition placing the belt under tension is maintained by a tensioning spring (FIG. 10) 194, one end of which is secured to the arm 180 and the other end anchored to the plate 32.

As the original passes between the nipping transparent cylinder 178 and the belt 58, it is exposed to the electromagnetic radiation emitted through the elongated slot 188 (FIG. 10) as it is advanced by the moving belt and is carried upward to the orlon covered discharge drive rollers 196 and 198 which discharge the original into the chute 52 at the rear of the apparatus. The original is prevented from deviating from the path between the rollers 196 and 198 and the exposure station by the guide member 199 that is carried on the side arms 180 and 182. The guide member 199 is arcuately shaped and when in its superposed position above roller 162 forms a guideway between itself and the moving belt.

The controls which synchronize the feeding of the copy paper and the original with the belt movement are shown in FIG. 11. The belt 58 is provided with a marker 200 that coacts with a sensing device such as the sensing arm 202 of a switch 204. The switch 204 with its sensing arm 202 is located in the path of movement of the marker so that the switch and belt coact maintaining the switch closed when the sensing arm engages the lateral edge of the belt. The marker in the instant embodiment is a cut-out portion in the path of the sensing arm 202 such that the arm 202 moves to a raised position as it engages the marker releasing the switch during the time the marker is in position at or above the switch. This condition obtains until the marker clears the sensing arm operating the switch 204 to its closed position.

It will be understood that while the instant invention is described with respect to a specific type of marker and sensing device, it is contemplated that a wide variety of sensing devices may be used such as photoelectric sensors, magnetic sensors, electromagnetic devices, or optical sensors capable of distinguishing different types of radiation in conjunction with markers such as transparent materials to permit the passage of a light signal to a photocell, a magnetic marker which would be receptive to a magnetic type sensor, or a charge carrying marker which would cause a reaction in an electromagnetic type sensor.

The location of the switch 204 and sensing arm 202 and their particular location as shown in FIG. 11 represents the home position from which the sequence of the various instrumentalities is controlled as a timing function.

As shown in FIG. 11, there is provided the timing control identified as 206, consisting of a bank of cams 208 axially mounted on a cam shaft 210 and arranged to actuate a bank of switches 212. The cam switch arrangement is provided for certain of the instrumentalities that make up the automatic copying device of this invention. The bank of cams is coupled to the main drive motor 168 through an electromagnetic clutch 214. The clutch 214 is energized in synchronization with the departure of the marker 200 at the home position by actuating the switch 204 as the arm 202 of said switch senses the absence of the marker. The commencement of rotation of the timing cams is controlled by the radial position of cam 220 on the shaft 210, which is the homing cam. The homing cam has a home position in which its switch 220A is closed. The home position for the cam 220 is a one-time manual setting and thereafter the control circuit automatically homes in the cam when the markers are in position opposite switch 204. This is accomplished by providing a relatively slightly longer time period for the marker to complete one cycle than is required by the homing cam to complete one revolution so that the cam arrives at its home position in advance of the marker to de-energize the clutch 214 and thereby stop rotation of the bank of cams 208.

It will be appreciated that since the photoconductive belt lengths can vary the aforedescribed control assures that cam 220 reaches its home position in advance of the belt 58 de-energizing the clutch 214 uncoupling the shaft 210 from the main drive. In the circumstance the belt would arrive at its home position before the cam 220, it would continue to move past its home position and the subsequent uncoupling of the clutch 214 would result in stopping the cam at its home position while the belt went beyond its home position. Since the belt must fit onto the assembly 56 it will always be slightly longer.

The presence of an original at the infeed station (FIG. 9) is sensed by the switch 174 which energizes the radiation source 187. Switch 174 de-energizes the motor 166 and energizes the main drive motor 168, starting the movement of the belt causing, in turn, the actuation of switch 204 and the energization of clutch 214 through the latching relay 302 (FIG. 12).

As the bank of cams 208 begin rotation, they will be in synchronization with the marker 200 on the belt. Cam 222 and its switch 222A control the apparatus during the duplicating mode taking over the function of switch 174. The duplicating mode controls will be discussed in greater detail hereinafter. Cams 224 and 226, which are part of the bank of cams 208, control the feeding of the copy paper 40 from the magazine assembly 38. As shown in FIG. 11, cam 224 is radially positioned with respect to and other cams so that the cam depression is offset in relation to the cam depression of 220 so that it will actute switch 224A a predetermined time after cam 220 actuates switch 220A. Closed switch 224A energizes clutch 128 coupling gear 120 with the shaft 230 (FIG. 8). The shaft 230 turns counter-clockwise taking its direction from gear 120 which is part of gear train 118 and 114 (FIG. 8). Gear 114 is axially mounted on shaft 116 which is powered by the main drive motor 168. Reverse movement continues for short duration sufficient to dislodge the top sheet at which time clutch 126 is de-energized and clutch 128 is energized. Clutch 128 couples shaft 124 to the shaft 230 which now causes the belt 130 to turn in the direction of gear 120. Gear 118 is mounted on a stub shaft 122 and rotates in a clockwise direction. The stub shaft 122 is coupled to the shaft 230 when clutch 126 is energized, coupling the gear 118 to shaft 122 imparting clockwise rotation to the gear belt 130 turning the shaft 230 in a clockwise direction.

The paper feed wheels 50 are driven by a timing belt 232 connected to shaft 230. It will be appreciated that control of the feeding of a single sheet of paper 40 from the stack is controlled by cams 224 and 226 which impart first a reverse movement of the feeder wheels to free the sheets from the stack and then followed by a forward movement.

While the arrangement described calls for selective reverse and forward movements of the sheet feed mechanism, it will be understood that the controls can be used to forward feed the sheet without the step of reverse feeding. The important feature involved is the feeding of the copy sheet in timed relation with the belt movement.

The copy sheet 40 is advanced to a ready position 233 by the feed wheels 50 which is at a point just before the transfer station identified generally as 234 (FIG. 11). A switch 136 having a sensing arm 134 is positioned in the path of the copy sheet at the approach to the transfer station 234. As the lead edge of the sheet engages the sensing arm 134, it closes switch 136 de-energizing the clutch 126 and stopping the sheet at the ready position 233.

Above the transfer station 234 is a developing station 240 which is provided with the well-known magnetic brush applicator 242 (FIG. 11). As the portion of the belt bearing the latent electrostatic image leaves the exposure station 164, it passes through the developer station making contact with the magnetic brush applicator 242 which deposits a loosely adhering powder on the image areas.

As the belt leaves the developing station, the cam 228 will actuate its switch 228A which re-energizes the clutch 126, thereby advancing the sheet from its ready position into the transfer station where it passes between the belt and the transfer roll 244. The transfer roll 244 is rotatably mounted between pillow blocks 246 on the base plate 34 so that it is in pressure contact with the belt adjacent drive rollers 60. The loose powder image is fused by a radiant heating unit 248 located underneath the station 18.

The operation of the transfer station will not be discussed in detail here. A detailed description of the operation of the transfer station may be had by referring to the aforementioned copending application Ser. No. 675,4633. The original after passing through the exposure station 164 leaves the area between the belt 58 and the cylinder 178 and is received between rollers 196 and 198 driven by belt 254 (FIG. 9) connected to the gear train 112, 114 which in turn are part of the main drive. The original falls into the guide chute 52 and is guided out an exit way into a tray or other suitable catcher (not shown) at the rear of the machine.

Directly above the rollers 196 and 198 is the wiring panel 256 which houses the various relays and other components controlling the sequenching of the apparatus.

FIG. 12 illustrates the electrical circuit identified generenally as 260 which furnishes the power and controls the operation of the apparatus in accordance with this invention. The control circuit may be subdivided into subcircuits which include the belt drive control subcircuit 262, the orginal feed subcircuit 264, cam sequence controls 266 and the paper feed control circuit 268.

The circuit 260 is powered by a 115 volt A.C. line connected across the feeder lines 270 and 272 through the main switch 14.

The belt control circuit 262 includes a series of sensing switches connected across the feeder lines, each operating a contact relay. The original switch 174 is in series connection with the relay 276. The homing position for the belt is fixed by locating the switch 204 and the sensing arm 202 in the apparatus at the proper location, with the sensing arm in the path of the marker 200 and switch 204 controls relay 280 in series connection with the switch. The copy sheet 40 is fed to its ready position fixed by the location of switch 236 and its sensing arm 238 which is series-connected with relay 282.

Closure of the main switch 14 applies power to the heater unit 248 and the subcircuits 262, 264, 266, and 268. The drive motor 166 is connected across the feeder lines through the normally closed contacts 276E, relay 290 and its contacts 290A and 290B. Upon closure of main switch 14 relay 290 is energized closing the contacts 290A and 290B energizing the motor 166.

As the operator inserts the subject original to be reproduced, the arm 176 actuates the switch 174 energized the relay 276. Upon energization of relay 276, its contacts 276A, 276B, 276C, and 276D are made. Contact 276A moves to the closed position interrupting the current supply to the motor 166 and energizing relay 292. Energization of relay 292 makes its contacts 292A, 292B, and 292C.

Contact 276B in its closed position energizes the main drive motor 168. The original at this point is in a stopped position between the pair of infeed rollers 160 and 162. Closure of contacts 292C energizes the clutch 172 coupling the main drive to roller 162. The original now advances into the apparatus.

Closed contact 276B of relay 276 energizes the electromagnetic radiation source 187 which is placed in series connection across the feeder lines through contact 294B of relay 294 which is part of the counting control 296. When making a single copy of a graphic original the counter control 296 is not actuated so that contact 294B of relay 294 is operative.

The subcircuit 266 involving the automatic sequence controls for the cams 220, 222, 224, 226, and 228, is rendered operative when the homing cam 220 is in its home position and the belt 58 is at its home position defined by marker 200 residing at the switch 204. The homing cam 220 is preset so that the depression 221 in the cam face coincide with the actuator for switch 220A. Accordingly, the home position initially is manually preset. Energization of the motor 168 moves the belt 58 in its predetermined path. Relay 280 is energized via switch 204 making its contacts 280A, 280B, 280C, and 280D.

The corona charging assembly 300 is energized through contacts 292A, 280A, and 276A responsive to the energization of relays 292, 280, and 276, respectively. Contact 276E remains open while 276 is held energized and relay 292 is held energized by its holding contact 292B in the closed position.

Contact 280B of relay 280 is closed connecting relay 302 across the line and closing its contact 302A. Responsive to the closure of contact 302A clutch 214 is energized coupling the cam shaft 210 with the main drive 168 causing the bank of cams 208 to rotate.

The power supply for the unit 304 includes the voltage applied to the magnetic brush 242 and transfer roll 244, is supplied through relay 306 connected across the feeder lines through contact 280C of relay 280 or contacts 276B or 282A. Energization of relay 306 closes contact 306A applying voltages to the core of the transfer roll and the frame of the magnetic brush assembly of negative 500 volts D.C. and a negative 100 volts D.C., respectively. Closed contact 280D causes current to flow in relay 308 actuating its contact 308A which conditions the cam switches 226A and 228A in the subcircuit 268.

Switch 224A is the next switch in the switch bank 212 actuated by cam 224 which actuates the clutch 128, driving the feed wheels in a direction which imparts a reverse movement to the sheet in the stack.

Switch 224A in the cam sequence control is actuated by cam 224 for a time duration determined by the dwell time provided by the cam contour which drives the feeder wheels 50 in one direction first imparting a reverse direction to the uppermost sheet in the stack. The switch is de-actuated, de-energizing clutch 128 by the cam action and the wheel direction is reversed through clutch 126 driving the paper forward in the direction of the transfer station 234.

The lead edge of the copy paper 40 strikes the sensing arm 238 actuating switch 236 which applies current to relay 282 making its contacts 282A and 282B. Closure of contacts 282A connects the drive motor 168 directly across the line providing an alternate connection for the motor when contracts 280C and 276B return to their normally open positions. Contact 282B actuated to its normally open position interrupts the connection to clutch 126 stopping the forward advance of the sheet.

Further movement of the sheet is controlled by cam 228 and its switch 228A which circuit is conditioned by the closure of contact 308A. When cam 228 actuates its switch 228A, the clutch 126 is re-energized for a sufficient length of time to feed the sheet into the nip between the belt 50 and the transfer roll 244.

The count control 296 is energized only when more than a single copy is required. The count control circuit 296 is energized when the operator sets the program by dialing multiple copies on the dial setting 16 on the front panel of the machine. Adjustment of dial 16 beyond the single copy setting actuates switch 316 closing its contact 316A thereby connecting the relay 294 across the feeder lines operating its contacts 294A, 294B, 294C, and 294D.

Closure of contact 294A completes the circuit to relay 312 through contact 276C energizing the relay and making its contacts 312A and 312B, the latter contact interrupting the connection to the solenoid 314. Cam 222 controls the program for the duplicating mode through its associated switch 222A. At the appropriate time in the cycle, cam 222 operates switch 222A generating a pulse signal, pulsing the stepping solenoid 314 which records the event of one completed copy.

The belt as it passes through the transfer station transfers the powder image to the transfer sheet. It will be appreciated that the photoconductive member retains its latent image so that the image may be redusted and transferred. The control circuit is now conditioned for the duplicating cycle by disabling the charging assembly 300, the radiation source 187, and the original feed drive so that the program of redusting the latent image may be carried out without the interference of these elements.

Energization of relay 294 pulls in contact 294A. As the original clears switch 174, relay 276 is de-energized dropping out its contacts including 276C and making contact 276E. Relay 312 is held energized through the contact 312A and contact 294A of relay 294 responsive to the closure of the cam switch 222A.

It will be appreciated that in the duplicating mode the original switch 174 will be actuated only once and thereby energize the subcircuit 264. Thereafter subcircuit 264 is disabled.

Power to the main drive motor 168 is supplied through switch 236 which is operated to its normally closed position each time a sheet of paper is fed energizing relay 282 and closing its contact 282A connecting the motor 168 across the feeder lines.

Energization of the drive motor continues to move the belt and as the marker moves away from the home position relay 280 is energized pulling in its contact 280B to supply current to relay 302. Contact 280D is closed and the connection of relay 308 across the feeder lines is completed through contact 294D. The power to the subcircuit 268 is then supplied through contact 308A of relay 308 in parallel connection with contact 294D of count control relay 294.

In the normal course of operation, when the cam 220 reaches its home position the relay 294 is energized to operate the paper feed cams causing a sheet of paper to be fed to switch 236 energizing relay 282. In the home position switch 220A of cam 220 is operated to the normally closed position at the completion of the first cycle energizing relay 302 causing 302A to reverse and open, thereby disconnecting the motor drive 168 from the cam shaft 210 by de-energizing clutch 214 (FIG. 11). As soon as the marker moves into the home position it will momentarily open switch 204 de-energizing the relay 280 and open its contacts 280C. Switch 236 is actuated by the lead edge of the copy paper energizing relay 282 and contacts 282A continue power connection to the motor 168. Belt 58 continues its travel and as the marker 200 moves beyond the home position switch 204 closes energizing relay 280. Closure of contact 280B energizes relay 302 making its contact 302A which pulls in the clutch 214 coupling the main drive 168 to the cam 210 in synchronized relation to the belt at its home position. In this manner the apparatus automatically feeds single sheets of plain paper seriatum in response to the number of copies selected by the operator.

As the counter 316 attains the "zero position" responsive to the final sheet of paper clearing switch 236 and thereby moving the switch to its normally open position interrupting the circuit to the relay 282 thereby de-energizing the relay. De-energization of relay 282 opens its contact 282A, which breaks the power connections to the drive motor.

Referring to FIG. 13 there is shown the apparatus of the second embodiment of this invention which is contained in a rectangular shaped framework 400 on which are mounted the various components. The top of the framework is equipped with an illumination station identified generally as 402 which includes a flat tarnsparent plate 404 such as glass supported on a top wall structure such as formed by enclosing the framework in a sheet metal casing 403. The glass plate 404 is provided with a flexible cover 405, equipped with handle 405A, which opens into a light-tight enclosure 406 containing the illuminating source 408 and the optical assembly 410. In the preferred embodiment a xenon flash source is employed. The adjustable optical assembly 410 includes a set of reflecting surfaces 412 and 414 and a lens assembly 416. Mirror 412 is mounted on a slidable bracket 413 adapted for horizontal movement toward and away from the lens assembly 416. The lens assembly 416 is mounted in an opening 417 in the front wall portion 418 and is also slidably mounted on the rods 419. The continuous optical path is formed from the surface of the plate 404 to the reflecting surfaces 412 through the lens 416 and reflecting surfaces 414 placing the subject to be copied in optical communication with the photoconductive belt 420. A linkage or control assembly 421 provides means for changing the size of the light image impinging on the planar portion of the belt 424 at the exposure station by adjusting the relative positions of the mirror 412 and the lens assembly 416. Operation of this control assembly in increasing the distance between the mirror 412 and the lens 416 results in a reduction of the image. Movement toward one another produces a 1:1 image projection. The reflective surface 414 directs the pattern of light and shadow onto the planar surface 424 formed by the disposition of the belt around the axially parallel drive rollers 426, 428, and 430 rotatably mounted in suitable journal mountings in the framework 400. The run of the belt over the planar portion 424 of the path is the exposure station.

Proper tensioning of the belt is achieved through the roller device 431 that is located inside the loop and applies a tensioning force at the back of the belt.

In advance of the exposure station is a source of ionic emission such as a corona electrode 432 which applies an electrostatic charge to the photoconductive surface of the belt. The corona charging unit is of the conventional type that is well known in this art.

The developing station is at the end of the exposure station and includes a magnetic brush assembly 436. The construction and operation of the magnetic brush assembly is comparable to the assembly described in connection with the first embodiment and therefore will not be discussed further.

The paper feed and supply assembly 438 is disposed beneath the optical assembly and arranged to automatically feed sheets of copy paper to the transferable powder-image-bearing belt surface to receive the image. The sheets of papers are fed seriatum to the transfer station 440. The paper feed comprises a sheet receiving platform 442 capable of moving vertically along the guide member 444 bringing the uppermost sheets in the stack in alignment with the paper feed roller 446 that removes the sheet and advances it along a path that takes it to the transfer station where it receives the transferable power image. The sheet is propelled through the transfer station by the action of the belt drive roller 430 in rolling contact with the transfer roller 448. As it leaves the transfer station it is received on a conveyor belt 450 and advanced to the fixing station which is a pressure unit 451 consisting of a pair of metal rollers 452 and 454 urged into pressure contact with one another through the biasing action of the coiled spring 455.

The platform 442 is driven in the vertical direction by the chain and sprocket drive 458 which includes the pawl 460 and ratchet wheel mechanism 462. The ratchet wheel 462 is indexed in a clockwise direction being driven by the pawl 460 which is affixed to the pivotable bracket member 464 which pivots about the ratchet wheel axis 466 through the action of the eccentric cam 468 driven from the main drive motor 470. The eccentric movement of cam 468 against the follower wheel 472 produces the pivotal movement in the bracket 464 advancing the ratchet wheel.

The ratchet wheel is held in the position against counter clockwise rotation by the pawl 474 attached to the arm 476. The platform advances upward bringing the topmost sheet into contact with the feeder wheel 446 which is controlled between a feed and raised position by the action of the solenoid 478 which is linked to the feeder wheel shaft 480 through the bracket 482. The wheel 446 is urged into the feed position by the tensioned spring assembly 484 one end of which is secured to a pivotably mounted cam plate 486 mounted outside the feeder wheels 446 on the feed wheel shaft 480.

A limiting control is provided that releases the pawl 474 in the circumstances that the feeder wheels are raised beyond a predetermined level. Movements of the feeder wheel in a vertical direction produces rotary movement in the cam plate 486 about the shaft 480 by the action of the follower wheel 490 which engages the cam face 492, disengaging the pawl 474. It will be appreciated that the feeder wheel 446 is successively raised and lowered for each sheet of paper that is fed.

As the sheet is fed from the top of the stack it is advanced to a ready position en route to the transfer station being reecived between a pair of spaced apart rollers 493 and 494. The lead edge of the sheet abuts a movable gate member 495. The roller 493 is driven by a pulley (not shown) mounted on shaft 469 and is adapted to move with the gate. When the gate is lowered, roller 493 engages roller 494 advancing the sheet to the transfer station. Operation of the solenoid 478 is controlled by sensor 528. The absence of a sheet of paper between the roller 493 and 494 activate the sensor calling for the feeding of a sheet of paper to the gate 495.

Figure 14:
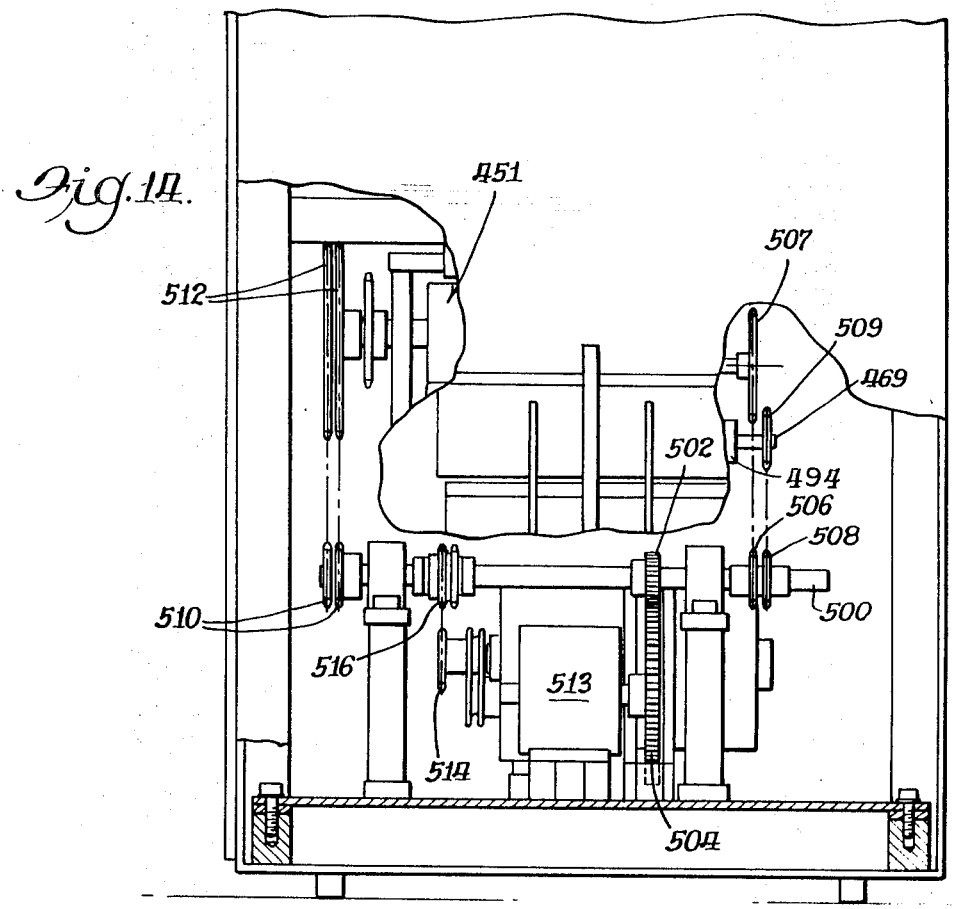
FIG. 14 is a partial front view along 14—14 showing the drive unit.

The various instrumentalities are driven through the main drive mechanism 470 as shown in FIG. 14 considered with FIG. 13. The motor 470 drives the main drive shaft 500 through the gear set 502 and 504. Through a series of pulley arrangements the photoconductive belt 420 (FIG. 13) is driven by pulleys 506 and 507 and the platform indexing drive is connected to the shaft 500 via pulleys 508 and 509.

The double set of pulleys 510 and 512 provides the drive for the fusing unit 451.

The developed unit is driven by a separate drive motor not shown.

The main drive mechanism (FIG. 14) is equipped with a conventional electromagnetic brake and clutch unit 513 for controlling the speed of the belt during the imaging and duplicating mode. During the imaging mode the drive is at a slow speed of about 6 ft./min. and upon completion of the imaging cycle the drive is shifted to a higher speed of 15 ft./min. During the imaging cycle the clutch is disengaged applying power to pulley 514 connected to the shaft 500 through pulley 516 which in turn drives the pulley 506. The gears 502 and 504 are in idling engagement. At the conclusion of the imaging cycle the clutch is engaged, coupling gear 504 to the shaft 500 through the smaller gear 502 producing a higher speed resulting from the change in gear ratio.

At the conclusion of the duplicating cycle the drive motor and clutch are de-energized, the brake is energized bringing the main drive unit to a stop on a predetermined signal.

Figure 15:
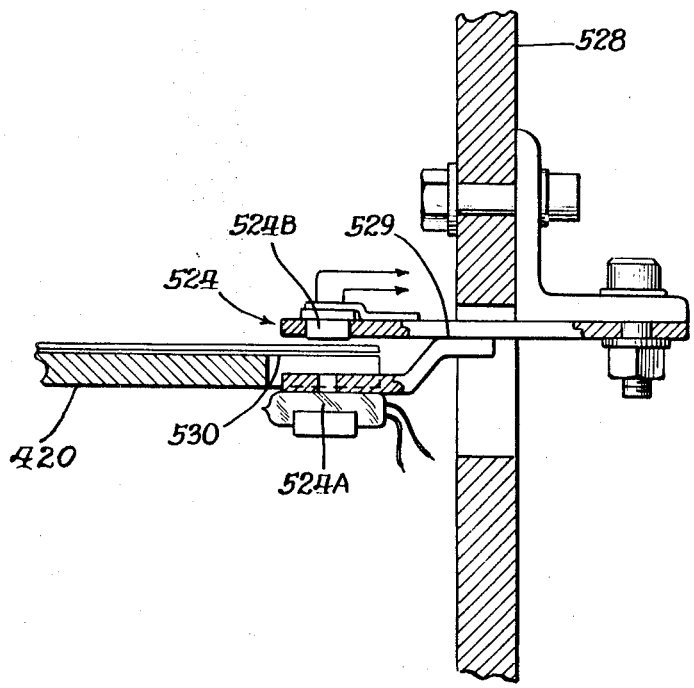
FIG. 15 is an enlarged detail showing the mounting of sensing units.

Referring again to FIG. 13 there is disposed along the planar run 424 of the belt 420 a series of sensing devices 520A, 522A, 524A, and 526A such as photocells and light emission sources 520B, 522B, 524B, and 526B for sensing the marking means on the belt identified as 530 and 539. Referring to FIG. 15 the individual sensor 524 is shown mounted on the inner wall portion 528 on a bifurcated bracket 529 so that the edge of the belt with its first marked portion 530 passes between the emitter 524A and the cell unit 524B which straddle the belt edge. Spaced at an equal distance from the marker 530 is a second marker 539. The marker in this instant is a vacuity in the belt, but it is contemplated that other means could be employed to mark the belt location such as a mechanically projecting element capable of being sensed by a switch arm, a magnetic marker that can be sensed by a gauss sensing unit, or equivalent arrangement. The emitter unit 524A is connected to a low voltage source and the photocell 524B is connected to a control circuit for programming the operation of the apparatus responsive to the signals received from said sensing units.

Referring to FIG. 16 there is shown the wiring diagram of the control circuit 540 for the second embodiment. The circuit 540 is powered by a 115 volt AC line connected across the feeder lines 542, 544 each having an inline fuse 546, 548.

Closure of the main switch 550 applies power to the main relay 554 through normally closed switch 556. This energizes the relay closing contacts 554A, 554B, and 554C. Contacts 554A holds the relay 556 energized through normally closed contacts 573A. Feeder lines 542 and 544 supply power to pilot light 552 and the emitter sources 520A, 522A, 524A, 526A, and 528A each in series with 150,000 ohm resistors 521, 523, 525, 527, and 529, respectively.

Closure of normally open contacts 554B applies current to the feeder line 542 connecting the illumination and electrode subcircuit 560, which includes the bias power supply 562, the transfer electrode 448 and developer unit 436, directly across the lines 542 and 544. The separate drive motor 564 for the developer unit 436 is energized. The brake 568 which controls the main drive motor 570 is connected across the output terminals of full wave rectifiers 572. The input side of the rectifier is connected across the feeder lines which includes a two second time delay relay 573. Closure of the main switch applies current to the time delay relays 565, 566 which delay the operation of the clutch and sheet feeder relay 567 for 20 seconds and 9 seconds, respectively.

Counter selector control 574 is closed by the operator selecting the number of copies to be reproduced which connects relay 576 across the line closing the normally open contacts 576A, 576B, 576D and opens normally closed contacts 576C and 576E. Contacts 576A connect relay 578 across the line. Energization of relay 578 closes normally open contacts 578A and 578B completing the circuit to the main drive motor 570. Normally closed contacts 578C are disconnected to open the circuit to rectifier 572 dropping off the brake and starting the motor.

Contacts 576B when in the closed condition partially completes the connection to the input terminal of the rectifier 580 for applying DC power to the clutch 582 that controls the speed of the drive for the imaging cycle and duplication cycle.

A sensor 528B in parallel connection with a 30,000 ohm resistor 535 located in the copy paper feed path is energized and senses absence of a sheet of paper between the rollers 493 and 494 thereupon completing the power connection to relay 588 disconnecting its normally closed contacts 588A which interrupts the power to the solenoid 478 causing a sheet of paper to be fed by the feeder wheels 446. Upon arrival of the sheet at the sensor 528B the solenoid 478 is energized, lifting wheels 446. The sheet is stopped by the gate 495 and is advanced responsive to the energization of solenoid 622 controlled by the sensor 522B.

Energization of the main drive motor 570 causes the belt to move in its predetermined path. The series of photocells 520B, 522B, 524B, 526B are located in the path of the belt. Each photocell is in parallel connection with 150,000 ohm resistors 531, 532, 533, and 534, respectively. As the marker 530 passes the photocell sensor 520B, it energizes relay 600. Energization of relay 600 closes its normally open contacts 600A completing the connection through normally closed contact 601A to energize relay 602. The xenon flash circuit is armed through normally closed contacts 618A and 604A. Relay 602 is energized and is held energized through its own closed contacts 602D. Normally closed contacts 602B are opened which interrupts the connection to the high voltage power supply 612 to the corona 432 through normally closed contact 614A of corona control relay 614.

The belt 420 starts to move in its predetermined path. As the marker moves off position from sensor 520B relay 600 is de-energized opening its contacts 600A.

The marker 530 passes sensor 522B, but the paper feed controls are disabled during the imaging cycle by the time delay relay 566 the sensor is ineffective at this time. At the end of the time delay cycle of relay 566, which is about 12 seconds, contacts 566A close, permitting relay 567 to perform its paper feed function.

As the belt continues to move the marker 530 passes sensor 524B energizing relay 601 which opens its contacts 601A, to de-energize relay 602 and close contacts 601B. Time delay relay 620 is energized through the operation of contacts 576C to the normally open position responsive to the energization of relay 576 when the operator sets control 574, which begins a ten second time delay. At the expiration of the 10-second time delay the contacts 620A of relay 620 close completing the circuit connecting relay 618 across the feeder lines through 576D, 620A, and 601B.

The corona unit 432 is energized and remains energized for the period governed by time delay relay 614. In the instant circuit 614 remains energized for the period of time required by the length of the belt to traverse the exposure area, which is about 2 to 3 seconds, holding closed the circuit to 612 through contact 614A.

The marker 530 passes sensor 526B which energizes relay 626 operating its contacts 626A from the normally closed position to the normally open. The relay at this point in the cycle performs no function since relay 567 has not been energized due to the delay action of the timer 566.

The charging unit is energized so that the run of belt reaching the exposure station 424 arrives there in a charged condition and the flash lamps 608 are conditioned to illuminate the subject to be reproduced. As the second marker passes the sensor unit 520B relay 600 is again energized, making its contact 600A energizing relay 602 and operating normally open contacts 602A and 602D to the closed condition and normally closed contacts 602B and 602C to the normally open condition. The lamps 608 flash in response to closure of contacts 602A. The charging unit 432 is de-energized responsive to opening of contacts 602B when relay 602 is energized resetting the relay 614.

As the second marker 539 passes the sensor 524B relay 601 is energized, de-energizing relay 602, and again turning on the corona charging unit through contact 602B in its normally closed position. Relay 614 starts timing.

As the marker 539 passes sensor 522B relay 567 is energized since timer 566 has now timed out closing contact 566A. Energization of relay 567 closes its contact 567B which holds the relay energized until after the marker clears the sensor 522B and contact 567A is opened which de-energized the solenoid 622 dropping the gate permitting the feeding of the paper from the ready position to the transfer station so that the image created on the run of the belt preceding the second marker is transferred to the receiving sheet. Concurrent with the feeding of the paper to the transfer station solenoid 624 is de-energized recording a count in the counter 574.

Responsive to the marker 539 passing the sensor 526B relay 626 is energized interrupting the connection to relay 567 by moving its contact 626A to the open position. The solenoid 622 is energized and the gating device is closed preventing the feeding of the next sheet until sensor 522B is next actuated. Time delay 614 times out opening its contact 614A and the corona unit is de-energized.

As the belt continues on its path the first marker again passes sensor 520B. It will be appreciated that the run of the belt immediately in advance of the first marker is now fully charged and the lamps are flashed responsive to relays 600 and 602.

Sensor 524B next senses the marker 539 and relay 601 is energized and its contacts 601B close applying current to reay 618. Relay 618 is energized and is held energized through its closed contacts 618C. The power units 606 and 612 are de-energized through contacts 618A being operated from the normally closed condition to the normally open position.

Passing sensor 526B the marker 539 again energizes relay 626 and relay 567 is de-energized. Relay 565 times out closing its contact 656A which now completes the connection to the clutch 582 which is energized coupling the shaft 500 to the drive motor through the gear set 502—504 (FIG. 14) which is the high speed mode.

As each marker passes sensor 522B a sheet of paper is advanced to the transfer station and sensor 526B closes the gate to the transfer station as the marker passes the sensor. The sensors 520B and 522B are ineffective during the duplicating mode.

As the counter 574 through solenoid 624 reaches the 0 count, contact 574 opens de-energizing relay 576 opening its contacts 576A thereby de-enerizing relay 578 and contacts 576C closes starting the time delay relay 630 which maintains the power to relay 604 through the normally closed contacts 630A and 576E. Energization of relay 604 closes its contact 604C maintaining power on power relay 578 so the drive motor 470 continues to operate, with contacts 578A and 578B closed until relay 630 timed out.

Timing out of relay 630 de-energized relay 604 and 578. Time delay relay 573 through its contact 573A holds relay 554 energized with contact 554A in the closed position supplying power to the braking system for 2 or 3 seconds after the motor 470 is de-energized so that brake is fully effective. Upon timing out of relay 573 the brake 568 is de-energized and main power relay 554 is de-energized upon contact 573A moving to its noramlly open position and contacts 554A and 554B are opened interrupting the connection to the 115 volt line shutting down the machine.

The embodiments which have been described herein in some detail are capable of making many editions of an original subject on plain paper. The operation of the apparatus, which uses a one sided original, commences when the operator closes switch 14, programs the number of copies desired by turning the control 16 and then inserts an original face down into the infeed station 18 (FIG. 1). The motor 166 is energized advancing the lead edge of the original until it engages arm 176 actuating switch 174 which de-energizes the motor 166 preventing any further advance of the original which is stopped between the infeed rollers 160 and 162. The closed switch 174 energizes relay 276, closes contacts 276A, energizes relay 292 which applies current to rectifier 578. Clutch 172 is connected across the output terminals of the rectifier 278 through contacts 292C. The main drive motor 168 is energized through closed contacts 276B and clutch 172 couples the main drive to roller 162. The original now resumes its advance into the machine.

Start up of the machine assumes that the belt 58 is in the home position with the mark 200 opposite the switch 204 as controlled by the homing cam 220. The belt commences to move in its predetermined path and is charged by the corona assembly 300 which is energized through relays 292, 280, and 276 respectively. The timing cam shaft 210 begins to rotate in synchronization with the commencement of the belt movement responsive to the closure of contacts 302A actuating the clutch 214 thereby coupling the main drive 168 to the shaft 210.

The power supply for the electrode at the magnetic brush 242 and the transfer roll 244 is actuated by relay 306 which is energized when the original is first fed into the machine.

At the appropriate time as determined by radial disposition of the cams with respect to one another on shaft 210, cam 224 actuates its switch 224A which applies current to the clutch 128 controlling the paper feed wheels to move the top sheet in a reverse direction (FIG. 8). At the end of the reverse feed cycle the clutch 126 is energized coupling the feeder wheels to the gear 120 (FIG. 8) which moves the sheet in the direction of the transfer station.

The copy sheet 40 advances until it strikes the sensing arm 238 of switch 236 which energizes relay 282 opening its contacts 282B disengaging the clutch 126 stopping the advance of the copy sheet. The sheet is held at this ready position until cam 228 engages its switch 228A and at that precise time the clutch 126 is re-energized feeding the copy sheet to the transfer station between the belt 58 and the transfer roll 244.

When the copy sheet is fed responsive to cam 228, cam 222 operates its switch 222A pulsing the stepping solenoid 314 which records the event of one completed copy.

Relay 294 is energized by the operator setting the dial 16 and the stepping switch 316 for multiple copies which has the effect of disabling the illumination source 187, the charging assembly 300 and the original feed motor 166 during the duplicating cycle preventing an original from being fed to switch 174. During the imaging cycle, however, the setting of the switch 316 closes contact 316A and energizes relay 294 closing its contacts 294A and 294B and opening contact 294C. The lamp 187 is energized when the lead edge of the original actuates switch 174, energizing relay 276 operating its contacts 276B and 276C, to the closed position, the latter contacts energizing relay 312, closing its contacts 312A and energizing the illuminating source. The lamp 187 is de-energized when contact 276C is opened responsive to the tail end of the original clearing switch 174 de-energizing relay 276. Since further feeding of an original into the machine is prevented by the disconnection of motor 166 during the duplicating cycle the lamp remains de-energized.

As the tail of the copy sheet clears switch 236, relay 282 is de-energized opening its contacts 282A to the motor 168. Cam 222 steps the solenoid 314 for each copy sheet fed and when the count reaches 0 setting as the last sheet of the contact 316A is opened de-energizing relay 294 opening its contacts 294A and 294B de-energizing relay 312. As the last sheet of paper clears switch 236 relay 282 is energized dropping out contact 280B, relay 302 and its contact 302A. Contact 302A in the normally open position breaks the connection to the clutch 214 and open contact 282A shuts off the drive motor 168.

The operation of the machine represented by the second embodiment commences with the placement of an original in the glass platen 404 and pressing the power button 556. The operator next programs the machine selecting the number of copies desired by turning the selector control 574 thereby energizing relay 576 which energizes relay 578 completing the power connection to the main drive motor 570 through closed contacts 578A and 578B. The belt 420 begins to move being driven at slow speed during the imaging cycle. The selector control must be operated before the start switch in order to program more than a single copy.

The belt 420 is equipped with two markers 530 and 539 (FIG. 15) spaced apart at equal distances along the circumference of the belt. The movement of the belt is controlled so that the imaging occurs in the space between markers. At start up the marker 530 is at the home position opposite the sensor 520B, which is the normal condition of the machine; relay 600 is energized, closing its contacts 600A which applies current to relay 602 through normally closed contacts 601A. The charging unit 432 is not energized until the marker moves off home position de-energizing relays 600 and 602 operating contacts 602B to the normally closed position completing the connection of the power supply 612 through contacts 618A, 604A, 602B, and 614A. The span of the belt in advance of the marker 530 is uncharged and as the belt begins to move, the run of belt immediately following the marker 530 is applied a blanket charge. Energization of relay 602 flashes the lamps 608 through closed contacts 602A but they are ineffective since the belt was not charged.

The next sensor that is actuated by the marker 530 is 522B which at this time is ineffective to energize relay 567, the sheet feeding relay, because of open contacts 566A, held open by time delay relay 566. Since the first portion of the belt has no image thereon, relay 566 prevents the feeding of a sheet of copy paper to the transfer station during this portion of belt movement.

Sensor 524B next actuated by the marker energizes relay 601 and de-energizes relay 602 operating its contacts 602A to the normally open position.

The marker 530 passes the final sensor 526B which also is ineffective to feed a sheet of paper from the ready position to the transfer station because of time delay relay 566.

The second marker 539 is advanced toward the first sensor 520B energizing relays 600, 602 and the lamp flashes responsive to the closure of contacts 602A which together with closed contacts 618A and 604A complete the connection of lamp power supply 606 across the feeder lines. Thus, the first electrostatic image is produced on the portion of the belt preceding the marker 539.

The span of the belt in advance of the marker 530 now proceeds through the charging station and is sensitized. The exposed portion proceeds through the developer 436 and the transferable powder image is developed thereon.

As the second marker courses past the sensor 524B, the lamps 608 are flashed exposing the charged segment of the belt located along the planar run 424 of the belt producing the second image on the belt.

A sheet of paper has been advanced to the gate 495 controlled by solenoid 622. As the second marker passes sensor 522B, relay 567 is energized since time delay relay has timed out closing contact 566A. Energization of relay 567 de-energized the solenoid 622 opening the paper feed gate so that the paper at the ready position is fed to the transfer station 440 to receive the first powder image. As the marker passes sensor 526B relay 626 is energized operating in its contacts 626A energizing relay 567 and closing the gate.

After the first transfer has been made the first marker now advances to sensor 520B which flashes the lamps 608 responsive to the energization of lamp control relay 602. Accordingly, the second portion of the belt in advance of the first marker is exposed producing the second image on the belt.

Sensors 524B, 522B, 526B are energized to feed the second sheet of paper to receive the second transferable image by operating the gate controlling solenoids 622 through relays 628 and 626.

The time delay relay 565 is set to time out at the conclusion of the imaging cycle which ends when the second image is formed. When 565 is de-energized, its contacts 565A close energizing the clutch 582 so that drive is shifted into high speed.

Time delay relay 620, which is a 10-second delay, is energized when relay 576 is energized operating in its contacts 576C to the open condition completing the connection to time delay relay 620. After 10 seconds relay 620 times out closing its contacts 620A. Relay 618 is energized when contact 601B closes responsive to sensor 524B. The flash lamps are disabled due to the energized state of relay 618 which is held energized by 618B and open contacts 618A. Contacts 618A open disconnecting the supply 606 and 612 during the duplicating cycle. The belt continues to cycle with each latent image being developed and transferred to the receiving sheets fed in synchronism with each image area in accordance with the program setting of switch 574.

At the end of the cycle when contact 574 advances to a 0 position relay 576 is de-energized closing contacts 576E to the normally closed position energizing relay 604. Contacts 576C close responsive to relay 576 being de-energized which activates time delay 630. The lamp 632 is energized responsive to relay 604 which is conneted accross the feeder lines through closed contacts 576E and 602C and held energized by contact 630A of time delay relay 630 notwithstanding the movement of the belt which de-energizes relay 602.

The machine operation comes to a stop as relay 630 times out opening its contact 630A. The movement of the belt which brings one of the markers opposite sensor 520B energizes relay 600 and 602 interrupting the circuit to relay 604 through open contacts 602C which in turn open contacts 604C de-energizing relay 578 opening contacts 578A and 578B which shut down the motor and simultaneously energizes the brake 568 through closed contacts 578C. The current to the main power relay 554 is held on for several seconds through time delay relay 573 which is energized at the same time the brake comes on through contact 573A. In this manner the power supply is maintained so that the brake is effective to stop the belt at the home position.

While the various embodiments of this invention have been described in some detail, it is not confined to the specific structures, and it is intended to cover such changes or modifications as may come within the scope of the appended claims.

What is claimed is:

1. In a photoelectrostatic apparatus for making copies of a graphic original on a copy sheet, the combination comprising:
a photoconductive medium comprising a photoconductive layer applied to a conductive support formed into a continuous belt adapted for movement along a given path,
drive means for moving said belt along said path,
marker means on said belt for establishing a home position for said belt relative said path, and
control means establishing a timing cycle related to the period between the time when said marker leaves and returns to said home position, said control means including sensing means for sensing the marker means to synchronize the timing cycle with the movement of the belt along the path.

2. The apparatus as claimed in claim 1 wherein the time elapse for said marker to return to said home position is greater than the period of said timing cycle.

3. The apparatus as claimed in claim 1 wherein said control means includes means mounting the sensing means in the path of said belt for sensing the marker means at said home position.

4. The apparatus as claimed in claim 3 including image producing means disposed along said path which are activated by said control means during said timing cycle.

5. The apparatus as claimed in claim 4 wherein said sensing means is disposed in said path for generating a signal responsive to the presence of said marker and signal receiving means included in said control means for receiving said signal and activating said image producing means.

6. The apparatus as claimed in claim 1 wherein said control means includes timing means having a starting position corresponding to said home position said timing means being actuated in response to said marker means leaving said home position.

7. The apparatus as claimed in claim 6 wherein said timing means comprises cam means which is connected and disconnected to said main drive means through clutch means.

8. In a photoelectrostatic apparatus of the type described, the combination comprising:
a photoconductive medium having a transferable image thereon adapted to move in a predetermined path,
image producing means located along said path controlled between an operative and non-operative condition,
a transfer station,
drive means,
a feed supply of receiving sheets for feeding one sheet at a time,
control means for rendering said image producing means operative to produce said transferable image on said photoconductive medium,
sensing means in the path of movement of said photoconductive medium for energizing said control means,
marker means associated with said photoconductive medium for activating said sensing means as said medium moves in its predetermined path whereby said image is transferred to said receiving sheet.

9. The apparatus as claimed in claim 8 wherein said sensing means includes a sensor positioned along said path defining a home position for said photoconductive medium when said marker means is positioned opposite said sensor.

10. The apparatus as claimed in claim 8 wherein said control means includes programming means for automatically making a predetermined number of transfers of said produced images corresponding to said original.

11. The apparatus as claimed in claim 8 wherein said drive means is rendered operative responsive to a copy demand placed on said apparatus.

12. The apparatus as claimed in claim 8 wherein said sensing means includes a sensor for synchronizing the feeding of a sheet of paper from said supply responsive to the movement of said marker means past said sensor so that the said receiving sheet arrives at said transfer station in time to receive the full image to be transferred thereto.

13. In a photoelectrostatic apparatus of the type described, the combination comprising:
a photoconductive medium having a transferable image thereon adapted to move in a predetermined path,
a transfer station,
drive means,
a feed station for feeding a graphic original into the apparatus,
a feed supply of receiving sheets for feeding one sheet at a time,
control means for synchronizing the feeding of said receiving sheet with the movement of said medium so that the receiving sheet arrives at said transfer station in time to receive the full image portion to be transferred thereto,
first switch means in the path of movement of said photoconductive medium for energizing said control means,
means associated with said photoconductive medium for actuating said first switch means at a predetermined point in its path of movement, and
second switch means responsive to the feeding of a graphic original into the apparatus for activating said drive means and moving the photoconductive medium.

14. The apparatus as claimed in claim 13 wherein said photoconductive medium comprises a photoconductive layer on a conductive support formed into a continuous belt.

15. The apparatus as claimed in claim 13 wherein said switch actuating means comprises a vacuity in said medium which is recognized by said sensor means.

16. The apparatus as claimed in claim 13 wherein said control means includes cam means axially mounted on a common shaft driven by said drive means for timing the movement of the photoconductive medium relative to said predetermined point and initiating the feed of said receiving sheets a predetermined period of time after the photoconductive medium leaves said predetermined point.

17. The apparatus as claimed in claim 16 including clutch means responsive to said cam means for energizing said feed supply.

18. In a photoelectrostatic apparatus, the combination comprising:
a photoconductive layer on a conductive support formed into a continuous belt,
drive means for moving the belt in a predetermined path past a series of processing stations arranged in a planetary fashion adjacent said path, said processing stations including:
(a) a charging station for applying a uniform charge to the photoconductive layer,
(b) an exposure station for projecting a pattern of light and shadow onto the charged layer,
(c) a developer station for applying electroscopic powder to the charged layer,
(d) a transfer station for transferring the material image to a receiving sheet,
(e) a feed supply station for supplying receiving sheets one at a time to said transfer station,
(f) an original feed station including transport means operable between a disabled and feed condition for feeding a graphic original to a predetermined location into the apparatus to be reproduced,
first control means responsive to the movement of said original to said location to energize said drive means and disable said transport means, and
second control means responsive to the movement of said belt for operating said transport means to the feed condition whereby a graphic original is fed in synchronization with said belt.

19. In a photoelectrostatic apparatus for making copies of a graphic original, the combination comprising:
a photoconductive medium comprising a photoconductive layer applied to a conductive support,
a feed supply of receiving sheets,
exposure means including an illumination source,
main drive means for moving the medium in a predetermined path past a series of processing stations relative to a home position,
transport means operable between a disabled and feed condition for feeding a graphic original into the apparatus,
a first sensing means in the path of the original for energizing said main drive means and said illuminating means,
control means responsive to the movement of said medium leaving said home position including means for synchronizing the feeding of said receiving sheet with the movement of said medium, and
a second sensing means in the path of the photoconductive medium at said home position for de-energizing the illumination source and the main drive means when said medium returns to said home position.

20. The apparatus as claimed in claim 19 wherein said transport means is disabled from feeding an original into said apparatus so long as said medium is out of its home position.

21. The apparatus as claimed in claim 19 wherein said control means includes timing means for establishing a cycle time commencing when said medium leaves said home position and terminating when said medium returns to said home position.

22. The apparatus as claimed in claim 21 wherein said timing means comprises cam means having associated therewith switch means and said cam means is driven by a constant speed motor.

23. The aparatus as claimed in claim 19 wherein said feed supply is actuated by said cam means at a fixed interval of time after said medium leaves said home position.

24. The apparatus as claimed in claim 19 wherein said transport means is equipped with drive means independent of said main drive means so as to receive an original and clutch means for coupling said transport means to said main drive means when said independent drive means is de-energized.

25. The apparatus as claimed in claim 24 wherein said independent drive means is disabled when the lead edge of the original engages said first sensing means and said clutch means is disabled so long as said belt is absent from its home position.

26. The apparatus as claimed in claim 19 wherein said control means includes program means for selecting N number of copies, signal generating means for generating a signal responsive to the movement of said photoconductive medium past said home position, said feed supply being actuated to feed a single sheet by said signal a predetermined period of time after said medium leaves said home position during each cycle and repeating each cycle until N number of sheets have been fed.

27. In a photoelectrostatic apparatus of the type described for making multiple reproductions of a graphic original, the combination comprising:
a photoconductive medium comprising a photoconductive layer on a conductive support adapted to move in a predetermined path relative to a home position along said path,
drive means for moving the photoconductive medium along said path of movement, means for producing a transferable powder image on said photoconductive medium, a transfer station for transferring said powder image to a receiving sheet, a feed supply of receiving sheets for feeding said sheets one at a time to said transfer station, transport means for feeding a graphic original into said apparatus to be reproduced, operable between a disabled condition and feed condition, program means for setting the number of reproductions to be reproduced, first sensing means in the path of said original for sensing the presence of the original entering the apparatus, first control means responsive to said first sensing means for energizing said drive means and disabling said transport means, second sensing means in the path of said photoconductive medium located at said home position.

locating means associated with said photoconductive medium which is recognized by said second sensing means to signal the home position of said medium, second control means responsive to the movement of the medium leaving said home position for operating the transport means to said feed condition, and third control means responsive to said second control means for repeatedly feeding a receiving sheet at a predetermined time after said medium leaves said home position, until the copy setting of the program means is attained, said last named control means including switch means for maintaining said drive means energized during the time when an original is not present to actuate said first switch means.

28. In a photoelectrostatic apparatus for making copies of a graphic original including copy producing instrumentalities for effecting an electrostatic reproduction, the combination comprising:

a photoconductive medium comprising a photoconductive layer applied to a conductive support formed into a continuous closed loop of belt adapted for movement in a predetermined path, a series of spaced markers disposed along said belt for programming the reproduction steps, sensing means disposed in said path for sensing the markings on said belt as it moves in said path, and control means responsive to said sensing mean for programming the copy producing instrumentalities in sequence with the movement of said belt along the path.

29. The apparatus as claimed in claim 28 wherein said marker means includes at least two markers spaced along the belt loop for activating said sensing means.

30. The apparatus as claimed in claim 29 wherein said marker means consists of a vacuity in said belt and said sensing means comprises a photocell unit responsive to the movement of said vacuity past said photocell unit.

31. In a photoelectrostatic apparatus for making copies of a graphic original, the combination comprising:

a photoconductive medium comprising a photoconductive layer applied to a conductive support formed into a continuous belt adapted for movement along a predetermined path, drive means for moving said belt along said path at a first imaging speed and a second speed during the duplicating mode, electrostatic image producing instrumentalities for creating an electrostatic image on said belt, marker means associated with said belt for programming the steps of electrostatic imaging, developer means for applying an electrostatic powder to said belt, transfer means for transferring the developed powder image to a receiving sheet, a receiving sheet feed supply for feeding said sheets to said transfer means, sensing means for sensing the presence of said marker means along said path including its presence at a home position, and control means responsive to said sensing means for sequentially activating said image producing instrumentalities during the imaging cycle and deactivating said instrumentalities during the duplicating cycle.

32. The apparatus as claimed in claim 31 wherein said belt is provided with at least one marker for each portion thereof capable of receiving an image thereon.

33. The apparatus as claimed in claim 31 wherein said belt has two portions for receiving two images thereon.

34. The apparatus as claimed in claim 31 wherein said drive means includes clutch means for coupling said drive means with gear control means for increasing the speed during the duplicating mode.

35. The apparatus as claimed in claim 34 wherein said control means includes time delay means for timing the duration of said imaging cycle measured from the time the belt leaves said home position before activating said clutch.

36. The apparatus as claimed in claim 31 wherein said control means includes means for disconnecting the imaging instrumentalities during the duplicating mode.

37. The apparatus as claimed in claim 31 wherein said control means include a first sensor for sensing the presence of a marker establishing said home position relative to said path, and a second sensor for energizing the imaging instrumentalities a predetermined period of time after said marker leaves said home position, said time interval determined by the distance said first and second sensors are spaced apart along the belt path.

38. The apparatus as claimed in claim 36 wherein said imaging instrumentalities includes a radiant energy source controlled by said second sensor.

39. The apparatus as claimed in claim 31 wherein said control means includes a first sensor for sensing the presence of a marker at said home position relative to said path, a second sensor for energizing the imaging instrumentalities after a predetermined period of time after said marker leaves said home position, a third sensor for activating the paper feed means and a fourth sensor for deactivating said feed means.

40. The apparatus as claimed in claim 31 wherein said control means includes count recording means.

41. The apparatus as claimed in claim 38 wherein a xenon radiant energy source is employed.

42. The apparatus as claimed in claim 31 wherein said receiving sheet feed supply includes stop means for intercepting said sheet at a predetermined location in advance of being fed to said transfer station.

References Cited

UNITED STATES PATENTS

| | | | |
|---|---|---|---|
| 3,427,658 | 2/1969 | Roberts | 355—13X |
| 3,450,473 | 6/1969 | Hunstiger | 355—13X |
| 3,485,622 | 12/1969 | Sewell | 355—13X |

SAMUEL S. MATTHEWS, Primary Examiner

R. A. WINTERCORN, Assistant Examiner

U.S. Cl. X.R.

355—13, 16